United States Patent
Ueno et al.

(10) Patent No.: US 7,329,696 B2
(45) Date of Patent: Feb. 12, 2008

(54) AQUEOUS SYNTHETIC RESIN DISPERSION

(75) Inventors: Yoshiyuki Ueno, Kyoto (JP); Toshihide Shima, Yokohama (JP); Tadashi Tanaka, Ashiya (JP); Munekazu Satake, Uji (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 261 days.

(21) Appl. No.: 10/502,546

(22) PCT Filed: Jan. 25, 2002

(86) PCT No.: PCT/JP02/00575

§ 371 (c)(1),
(2), (4) Date: Jul. 26, 2004

(87) PCT Pub. No.: WO03/064534

PCT Pub. Date: Aug. 7, 2003

(65) Prior Publication Data

US 2005/0131081 A1   Jun. 16, 2005

(51) Int. Cl.
*C08L 33/02* (2006.01)
*C08L 67/00* (2006.01)
*C08L 75/04* (2006.01)
*C08L 77/00* (2006.01)
*C08L 101/00* (2006.01)
*C08J 3/03* (2006.01)

(52) U.S. Cl. ............... 523/221; 524/501; 524/502; 524/507; 524/508; 524/513; 524/514; 524/515; 524/522; 524/538; 524/539; 524/540; 524/591; 524/601

(58) Field of Classification Search ............ 523/221; 524/501, 502, 591, 507, 508, 513, 514, 515, 524/538, 539, 540, 601, 522
See application file for complete search history.

(56) References Cited

U.S. PATENT DOCUMENTS

| | | | |
|---|---|---|---|
| 3,424,706 A | 1/1969 | Smith et al. | 260/29.6 |
| 3,929,678 A | 12/1975 | Laughlin et al. | 252/526 |
| 4,130,523 A | 12/1978 | Hoy et al. | 260/29.6 R |
| 4,230,823 A | 10/1980 | Alberts et al. | 521/137 |
| 4,331,447 A | 5/1982 | Kamada et al. | 44/20 |
| 4,524,102 A | 6/1985 | Hostettler | 428/318.8 |
| 5,162,434 A | 11/1992 | Pielartzik et al. | 525/66 |
| 5,238,767 A | 8/1993 | Horiie | 430/110 |
| 6,271,300 B1 | 8/2001 | Ohsumi et al. | 524/521 |

FOREIGN PATENT DOCUMENTS

| | | |
|---|---|---|
| EP | 0994137 A2 * | 4/2000 |
| GB | 1 543 099 | 3/1979 |
| JP | 55-31880 | 3/1980 |
| JP | 61-076517 | 4/1986 |
| JP | 61-76517 | 4/1986 |
| WO | 02/39524 | 5/2002 |

* cited by examiner

Primary Examiner—Ana Woodward
(74) Attorney, Agent, or Firm—Meyertons, Hood, Kivlin, Kowert & Goetzel, P.C.; Eric B. Meyertons

(57) ABSTRACT

A aqueous dispersion comprising particles of at least one resin selected from the group consisting of a polyaddition type resin, a polycondensation type resin, an addition condensation type resin, a ring-opening-polymerization type resin and an addition polymerization type resin; wherein the particle has at least two peaks in a particle diameter distribution curve; at least one of the peaks comprises at least one resin selected from the group consisting of a polyaddition type resin, a polycondensation type resin, an addition condensation type resin and a ring-opening-polymerization type resin. The aqueous dispersion exhibits a low viscosity even at a high concentration exceeding 65%, and has better stability with day. In addition, a paint, an adhesive, a pressure-sensitive adhesive and a fiber and textile processing agent using the dispersion of the present invention is excellent in storage stability even at a high concentration.

18 Claims, 2 Drawing Sheets

AQUEOUS SYNTHETIC RESIN DISPERSION

TECHNICAL FIELD

The present invention relates to an aqueous resin dispersion, in particular, an aqueous synthetic resin dispersion useful in paints, adhesives, pressure-sensitive adhesives and fiber and textile processing and treating agents.

BACKGROUND TECHNIQUE

Previously, as a process for preparing an aqueous high solid resin dispersion, a method of polymerizing a vinyl-based monomer in the presence of a pre-formed seed latex (U.S. Pat. Nos. 3,424,706 and 4,130,523) has been known.

SUMMARY OF THE INVENTION

An object of the present invention is to provide an aqueous synthetic resin dispersion having a low viscosity even at a high concentration.

Another object of the present invention is to provide an aqueous synthetic resin dispersion excellent in storage stability.

A further object of the present invention is to provide a quick-drying highly concentrated aqueous synthetic resin dispersion.

Still another object of the present invention is to provide an aqueous synthetic resin dispersion excellent in film forming property at drying.

A further other object of the present invention is to provide an aqueous paint which is excellent in coating suitability and can be coated at a large thickness.

The above and following other objects of the present invention can be attained by an aqueous dispersion comprising resin particles having at least two peaks in a particle diameter distribution curve and satisfying one or both of the following (i) and (ii):

(i) in a particle diameter distribution curve, a peak (P1) having a larger particle diameter and a peak (P2) having a smaller particle diameter among a highest peak and a second highest peak give a ratio of a peaktop particle diameter (P1)/a peaktop particle diameter of (P2), in a range of 2/1 to 100/1, and a ratio of a height of (P1)/a height of (P2) in a range of 1/1 to 10/1, both of (P1) and (P2) have a peak variation coefficient of 0.1 to 150%, a skewness of −10 to 10 and kurtosis of 0 to 10; and (ii) in a concentration range of an aqueous dispersion of 20 to 70%, the aqueous dispersion satisfies the following relationship equation (1) having a coefficient A of −2 to 0 and a constant item B of 1 to 5:

$$1/\log(\eta/\eta_0) = A\phi + B \quad (1)$$

wherein $\eta_0$ and $\eta$ represent Brookfield viscosities (mPa·s, 25° C.) of water and an aqueous dispersion having a resin concentration of $\phi$% by weight (hereinbefore and hereinafter, % represents % by weight unless otherwise indicated).

The aqueous dispersion comprises particles of at least one resin selected from the group consisting of a polyaddition type resin, a polycondensation type resin, an addition condensation type resin, a ring-opening-polymerization type resin and an addition polymerization type resin.

At least one peak among peaks in a particle diameter distribution curve comprises at least one resin selected from the group consisting of a polyaddition type resin, a polycondensation type resin, an addition condensation type resin and a ring-opening-polymerization type resin.

DETAILED DISCLOSURE OF THE INVENTION

Particle Diameter Distribution Curve

Figure 1:
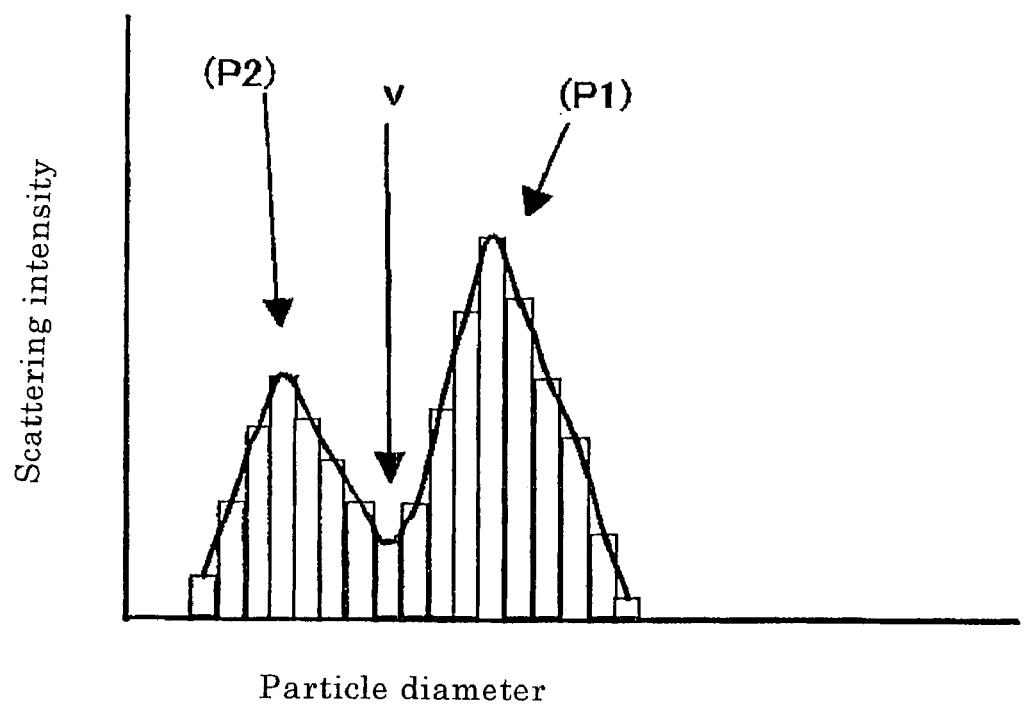
FIG. 1 and FIG. 2 are a graph showing relationship between a particle diameter and a scattering intensity in particle diameter distribution. A point v in the figures shows a lowest valley (minimal point) present between (P1) and (P2) in a particle diameter distribution curve.

In one aspect of the present invention, an aqueous resin dispersion satisfying the aforementioned requirement (i) [hereinafter, referred to as aqueous dispersion (I)] has a specified particle diameter distribution curve described below.

A particle diameter distribution curve is a histogram format particle diameter distribution curve which is produced by measuring weight distribution of a particle diameter at a normal temperature by a photon correlation or an ultrasonic measuring method, and in which a particle diameter is an abscissa and a scattering intensity is a ordinate. As an apparatus used for measurement, "ELS-2000" manufactured by Otsuka Electronics Co., Ltd. can be used in a photon correlation method, and "DT-1200" manufactured by Nihon Rufuto Co., Ltd. can be used in an ultrasonic measuring method. A photon correlation method is a preferable measuring method in that resolution is better in a submicron region.

An aqueous resin dispersion (I) has preferably 2 to 8, further preferably 2 to 4, particularly preferably 2 peaks in a particle diameter distribution curve in that an aqueous dispersion having a high concentration and a low viscosity is given.

In a particle diameter distribution curve, a peak (P1) having a larger particle diameter and a peak (P2) having a smaller particle diameter among a highest peak and a second highest peak have a ratio of a peaktop particle diameter of (P1)/a peaktop particle diameter of (P2) of at least 2/1 (preferably at least 2.2/1, particularly preferably at least 2.5/1), and a ratio of a height of (P1)/a height of (P2) of at least 1/1 (preferably at least 1.5/1, particularly preferably at least 1.8/1), whereby, better storage stability is imparted; have a ratio of a peaktop particle diameter of (P1)/a peaktop particle diameter of (P2) of at most 100/1 (preferably at most 20/1, particularly preferably at most 15/1), and a ratio of a height of (P1)/a height of (P2) at most 10/1 (particularly at most 5/1), whereby, it becomes possible to retain a low viscosity even at a high concentration.

(P1) and (P2) have a variation coefficient of usually 0.1 to 150% (preferably 1 to 100%, particularly preferably 15 to 70%), a skewness of −10 to 10 (preferably −5 to 5, particularly preferably 0 to 2), and a kurtosis of 0 to 10 (preferably 0.5 to 10, particularly preferably 1 to 5), whereby an aqueous dispersion having a low viscosity is given. A variation coefficient, a skewness and a kurtosis of a peak are calculated by the following equations (2), (3), and (4) respectively.

$$\text{Variation coefficient} = (s/x_i) \times 100 \qquad (2)$$

$$\text{Skewness} = \sum_{i=1}^{n}(x_i - x)^3 / n \cdot s^3 \qquad (3)$$

$$\text{Kurtosis} = \sum_{i=1}^{n}(x_i - x)^4 / n \cdot s^4 \qquad (4)$$

In the equations, X represents a scattering intensity in each particle diameter, $X_i$ represents an average of a scattering intensity at each particle diameter, n represents a degree of freedom, and s represents standard deviation of a peak which can be calculated by the following equation (5).

$$s = \sqrt{\frac{1}{n-1} \times \sum_{i=1}^{n}(x_i - x)^2} \qquad (5)$$

Relationship Between Concentration and Viscosity

In other aspect of the present invention, an aqueous resin dispersion satisfying the aforementioned requirement (ii) [hereinafter, referred to as aqueous dispersion (II)] has relationship between a concentration φ and a viscosity μ indicated by the aforementioned equation (1), in a range of a concentration of an aqueous dispersion of 20 to 70%. The equation (1) was derived from the Maron's equation applying to a highly concentrated dispersion system ["Chemistry of Polymer Latex" (authored by Soichi Muroi, published in 1965) p. 138].

A coefficient A and a constant item B in the equation (1) are calculated by the following method.

1) An aqueous dispersion is diluted or concentrated to prepare an aqueous dispersion having a resin concentration φ adjusted to 35, 45, 55 and 65%.

2) Brookfield viscosities η of aqueous dispersions having respective concentrations are measured.

3) A viscosity $\eta_0$ of water is measured.

4) A linear expression representing relationship between φ and 1/log (η/$\eta_0$) is obtained by a method of least squares, and a coefficient A and a constant item B are calculated.

The equation (1) is usually regressed by a linear expression and, when a contribution rate of φ to 1/log (η/$\eta_0$) is less than 0.6, approximation by quadratic or higher polynomial, or approximation by power can be performed. In that case, a rate of change in 1/log (η/$\eta_0$) relative to φ is taken as a coefficient A.

A concentration φ is such that 1 to 1.5 g of a sample is precisely weighed in a glass laboratory dish having a diameter of 9 cm, heated and evaporated to dryness in a circulating drier at 130° C. for 45 minutes, a weight of a remainder is precisely weighed, and a weight of a reminder relative to a sample weight is expressed by percentage. Adjustment of respective concentrations is performed by diluting with water, or concentrating by distilling water off and, in the latter (e.g. in the case of an aqueous dispersion having a concentration of lower than 65%), adjustment is performed by heating (at 40 to 60° C.) an aqueous dispersion under reduced pressure.

A viscosity can be measured using a rotatory viscometer manufactured by TOKIMEC (K.K.). A viscosity is measured using a No.1 rotor in the case of 20 to 150 mPa·s, a No.2 rotor in the case of larger than 150 mPa·s and not larger than 750 mPa·s, a No.3 rotor in the case of larger than 750 mPa·s and not larger than 3,000 mPa·s, and a No.4 rotor in the case of larger than 3,000 mPa·s and not larger than 20,000 mPa·s, at a rotation number of 60 rpm in any cases.

An aqueous dispersion (II) has a coefficient A of usually at least −2 (preferably at least −1, particularly preferably at least −0.5) and a constant item B of at least 1 (preferably at least 1.1, particularly preferably at least 1.15) from a viewpoint that a low viscosity is imparted; has a coefficient A of at most 0 (preferably at most −0.001, particularly preferably at most −0.015) and a constant item B of at most 5 (preferably at most 4.5, particularly preferably at most 3) from a viewpoint of the stability with day (difficulty of particle settling).

Among aqueous dispersions (I) and (II), a preferable dispersion is an aqueous dispersion (I) satisfying the aforementioned requirement (i), in particular, satisfying the aforementioned requirements (i) and (ii), from a viewpoint that an aqueous dispersion having a lower viscosity is easily obtained.

The aqueous dispersion [(I) and (II)] of the present invention has a concentration of usually 30 to 80%, preferably 50 to 75%, more preferably 60 to 70%.

A viscosity (25° C.) of the aqueous dispersion of the present invention is different depending on a concentration. At a concentration of 65%, a viscosity is usually 10 to 20,000 mPa·s, preferably 20 to 10,000 mPa·s, particularly preferably 30 to 5,000 mPa·s.

Synthetic Resin Constituting Aqueous Dispersion

The aqueous dispersion of the present invention comprises particles of at least one resin selected from the group consisting of a polyaddition type resin, a polycondensation type resin, an addition condensation type resin, a ring-opening-polymerization type resin and an addition polymerization type resin.

In the aqueous dispersion of the present invention, at least one peak among peaks in a particle diameter distribution curve comprises at least one resin selected from the group consisting of a polyaddition type resin, a polycondensation type resin, an addition condensation type resin and a ring-opening-polymerization type resin, and a resin constituting other peak may be an addition polymerization type resin.

Examples of a polyaddition type resin includes a polyurethane resin; examples of a polycondensation type resin includes a polyester resin, a silicone resin, a polyamide resin and a polycarbonate resin; examples of an addition polymerization type resin includes a vinyl-based resin (e.g. acrylic resin, styrene/alkadiene-based resin and vinyl acetate-based resin); examples of an addition condensation type resin includes a phenol resin and an amino resin (e.g. urea resin and melamine resin); examples of a ring-opening-polymerization type resin includes an epoxy resin.

Among these resins, a preferable resin is at least one resin selected from the group consisting of a polyaddition type resin, a polycondensation type resin and a polyaddtion type resin, and/or joint use of a polycondensation type resin and an addition polymerization type resin, in particular, joint use of one or more selected from the group consisting of a polyurethane resin (U), a polyester resin (E), and joint use of (U) and/or (E) and an acrylic resin (M) and/or a styrene/alkadiene-based resin (D).

The aqueous dispersion of the present invention has at least two peaks in a particle diameter distribution curve, and kinds of resins constituting those peaks may be the same or different. A preferable combination in the case of different is (U)/(E) and (U)/(M).

(U) is obtained by reacting active hydrogen atom-containing components comprising organic polyisocyanate (a1) and polyol (a2).

As (a1), organic polyisocyanates which have been previously used in preparation of polyurethane can be used. Such the polyisocyanate includes aromatic polyisocyanate of a carbon number (hereinafter, abbreviated C) (except for carbons in NCO group, same hereinafter) of 6 to 20 having 2 to 3 or more isocyanate groups, C2 to C18 aliphatic polyisocyanate, C4 to C15 alicyclic polyisocyanate, C8 to C15 aromatic aliphatic polyisocyanate, and modification of these polyisocyanates, as well as joint use of two or more of them.

Examples of aromatic polyisocyanate include 1,3- and/or 1,4-phenylene diisocyanate, 2,4- and/or 2,6-tolylene diisocyanate (TDI), crude TDI, 4,4'- and/or 2,4'-diphenylmethane diisocyanate (MDI), phosgenized crude MDI [crude diaminophenylmethane [a condensation product of formaldehyde and aromatic amine (aniline) or a mixture thereof; a mixture of diaminodiphenylmethane and a small amount (e.g. 5 to 20% by weight) of tri- or more-functional polyamine]: polyaryl polyisocyanate (PAPI)], 4,4'-diisocyanatobiphenyl, 3,3'-dimethyl-4,4'-diisocyanatobiphenyl, 3,3'-dimethyl-4,4'-diisocyanatodiphenylmethane, 1,5-naphthalene diisocyanate, 4,4',4''-triphenylmethane triisocyanate, m- and p-isocyanatophenylsulfonyl isocyanate; aliphatic polyisocyanate such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, 2-isocyanatoethyl-2,6-diisocyanatohexanoate; alicyclic polyisocyanate such as isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- and/or 2,6-norbornane diisocyanate; aromatic aliphatic polyisocyanate such as m- and/or p-xylene diisocyanate (XDI), α,α,α',α'-tetramethylxylylene diisocyanate (TMXDI); modified polyisocyanate such as modified aforementioned polyisocyanate (urethane group, carbodiimide group, allophanate group, urea group, biuret group, uretodione group, uretoimine group, isocyanurate group and/or oxazolidone group-containing modified polyisocyanate; free isocyanate group content is usually 8 to 33%, preferably 10 to 30%, particularly preferably 12 to 29%), and modified polyisocyanate such as modified MDI (urethane-modified MDI, carbodiimido-modified MDI, trihydrocarbylphosphate-modified MDI etc.), urethane-modified TDI, biuret-modified HDI, isocyanurate-modified HDI, and isocyanurate-modified IPDI. Examples of polyol used in preparation of urethane-modified polyisocyanate [free isocyanate-containing prepolymer obtained by reacting excessive polyisocyanate (TDI, MDI) with polyol] include low-molecular polyol described later. Examples of joint use of two or more include joint use of modified MDI and urethane-modified TDI (isocyanate-containing prepolymer). Among them, preferable aromatic polyisocyanate includes aromatic polyisocyanates having the number of functional groups of 2 to 3, particularly TDI, MDI, HDI, IPDI, hydrogenated MDI, XDI and TMXDI.

Examples of (a2) include a high-molecular polyol having a hydoxyl group equivalent (Mn per hydroxyl group) of 150 or more (a21) and a low-molecular polyol (a22), and joint use of two or more of them [hereinbefore and hereinafter, Mn represents a number average molecular weight measured using gel permeation chromatography (GPC)].

Examples of (a21) include polyesterpolyol (a211), polyetherpolyol (a212), polyolefinpolyol (a213) and polymer polyol (a214). Examples of (a211) include condensed type polyester (a2111), polylactonepolyol (a2112), polycarbonatepolyol (a2113) and castor oil-based polyol (a2114). Examples of (a212) include an alkylene oxide (hereinafter, abbreviated as AO) adduct of active hydrogen atom-containing compound (a2121), and a coupled adduct (a2122).

Examples of (a22) include polyhydric alcohol (a221), dihydric to octahydric or more-hydric, having a hydroxyl group equivalent of not smaller than 30 and less than 150, and an AO low mol adduct (a222) of an active hydrogen atom-containing compound.

Examples of (a221) include dihydric alcohol such as C2 to C12 or higher aliphatic, alicyclic and aromatic dihydric alcohol [(di)alkylene glycol (represents alkylene glycol and dialkylene glycol)]. Hereinafter, (same expression is used), such as (di)ethylene glycol, (di)propylene glycol, 1,2-, 1,3-, 2,3- and 1,4-butanediol, neopentyl glycol, 3-methyl-1,5-pentanediol, 1,6-hexanediol, 2-methyl-1,8-octanediol, 1,9-nonanediol and 1,12-dodecanediol; low-molecular diol having a cyclic group, for example, those described in JP-B No.45-1474: bis(hydroxymethyl)cyclohexane, bis(hydroxyethyl)benzene etc.); trihydric to octahydric or more-hydric polyhydric alcohol such as alkanepolyol (triol such as trimethylolpropane, glycerin and hexanetriol; tetra- or more-hydric highly functional polyol such as pentaerythritol, sorbitol, xylitol and mannitol), intermolecular or intramolecular dehydrate of them (diglycerin, dipentaerythritol, sorbitan, etc.), sugars (glucose, fructose, sucrose, etc.) and derivative thereof (for example, glycoside such as α-methylglycoside); as well as hydrophilic group-containing polyol described later.

Examples of AO used in preparation of (a2121) and (a222) include C2 to C12 or higher AO, such as ethylene oxide (EO), propylene oxide (PO), 1,2-, 1,3- and 1,3-butylene oxide, tetrahydrofuran (THF), α-olefin oxide, styrene oxide, epihalohydrin (epichlorohydrin etc.), and joint use of these two or more (random and/or block).

Examples of an active hydrogen atom-containing compound used in preparation of (a212) and (a222) include compounds having 2 to 8 or more active hydrogen atoms (compounds one or more of hydroxyl group, amino group, mercapto group, carboxyl group, etc.); such as polyhydric alcohol, polyhydric phenols, amines, polycarboxylic acid, phosphoric acids, polythiol and a mixture of two or more of them. Examples of polyhydric alcohol include the aforementioned polyhydric alcohols examples of polyhydric phenols include monocyclic polyhydric phenols (pyrogallol, catechol, hydroquinone, etc.), and bisphenols (bisphenol A, bisphenol F, bisphenol S, etc.).

Examples of amines include monoamines and polyamines. Examples of monoamines include ammonia; primary monoamine such as C1 to C20 monohydrocarbyl (alkyl, cycloalkyl, aryl, aralkyl) amine (butylamine, cyclohexylamine, aniline, benzylamine); and alkanolamines (C2 to C4 alkanolamines having hydroxyalkyl group; monoethanolamine, diethanolamine, triethanolamine, triisopropanolamine).

Examples of polyamines include C2 to C18 aliphatic polyamines [e.g. alkylene diamine (ethylene diamine, trimethylenediamine, hexamethylenediamine, etc.), and polyalkylenepolyamine (diethylenetriamine)], C4 to C15 alicyclic polyamines (dicyclohexylmethanediamine, isophoronediamine, etc.), C8 to C15 aromatic aliphatic polyamines (xylylenediamine, etc.), C6 to C20 aromatic polyamines (phenylenediamine, tolylenediamine, diethyltolylenediamine, diphenylmethane diamine, diphenyletherdiamine, polyphenylmethanepolyamine, etc.), and heterocyclic polyamines (piperazine, N-aminoethylpiperazine and those described in JP-B No.55-21044).

Examples of polycarboxylic acid include divalent to octavalent or more-valent C4 to C40 or more aliphatic, alicyclic and aromatic carboxylic acids; examples include dicarboxylic acids such as aliphatic dicarboxylic acids (succinic acid, adipic acid, azelaic acid, sebacic acid, fumaric acid, maleic acid, etc.), alicyclic dicarboxylic acids (dimer acid, etc.) and aromatic dicarboxylic acids (terephthalic acid, isophthalic acid, phthalic acid, etc.), as well as tri- or more-valent polycarboxylic acids (trimellitic acid, pyromellitic acid, etc.).

Examples of phosphoric acids include phosphoric acid, phosphorous acid, phosphonic acid; examples of polythiol include polythiols (in which at least a part of OHs are substituted with SHs) corresponding to the aforementioned polyhydric alcohols, and polythiols obtained by reacting a glycidyl group-containing compound and hydrogen sulfide.

Addition of AO to an active hydrogen atom-containing compound can be performed by the conventional method, and can be performed under normal pressure or under pressure without a catalyst or in the presence of a catalyst (e.g. alkali catalyst, amine-based catalyst, acidic catalyst) (particularly, at a later stage of AO addition) at a one stage or a multiple stage. For example, there is a method of charging an active hydrogen atom-containing compound and a catalyst in a pressure reactor, and pressing AO therein. Examples of a catalyst include alkali catalysts such as hydroxides of alkali metals (lithium, sodium, potassium, cesium, etc.); acids [perhalogenoic acid (perchloric acid, perbromic acid, periodic acid), sulfuric acid, phosphoric acid, nitric acid, preferably perchloric acid] and salts thereof [preferably salts of divalent or trivalent metals (Mg, Ca, Sr, Ba, Zn, Co, Ni, Cu, Al)]. A reaction temperature is usually 50 to 150° C. and a reaction time is usually 2 to 20 hours.

Joint use of two or more kinds of AOs may be block addition (chip type, balance type, active secondary type, etc.), random addition or mixed system of both of them [chipping after random addition: 0 to 50% by weight (preferably 5 to 40% by weight) of an ethylene oxide chain arbitrarily dispersed in a molecule is possessed, and 0 to 30% by weight (preferably 5 to 25% by weight) of an EO chain is chipped at a molecular end]. Among AOs, preferable are EO alone, PO alone, THF alone, joint use of PO and EO, and joint use of P0 and/or EO and THF (in the case of joint use, random, block and mixed system of both of them).

The addition mole number of AO is usually 1 to 140, preferably 1 to 110, particularly preferably 1 to 90 per active hydrogen atom. When the addition mole number exceeds 140, the resulting polyurethane resin becomes soft, and a strength thereof is reduced.

After completion of the AO addition reaction, a catalyst can be neutralized, and the catalyst can be removed and purified by treating with an adsorbent, as necessary.

Examples of (a2121) include polyoxyethylene polyol [polyethylene glycol (hereinafter, abbreviated as PEG) etc.], polyoxypropylene polyol [polypropylene glycol (hereinafter, abbreviated as PPG) etc.], polyoxyethylene/propylene polyol, polytetramethylene ether glycol, and EO and/or PO adduct of bisphenols.

Examples of (a2122) include two or more molecules of (a2121) coupled with alkylene halide (C1 to C6, for example, methylene dichloride).

It is desirable that (a212) has a small unsaturation degree (0.1 meq/g or smaller, preferably 0.05 meq/g or smaller, particularly preferably 0.02 meq/g or smaller), and it is desirable that (a212) has a content of a primary hydroxyl group of at least 30%, preferably at least 50%, particularly preferably at least 70%.

Examples of (a2111) include a product obtained by polydcondensation of polycarbonate (c1) to polyol, examples of (a2112) include a product obtained by polyaddition of lactone (c2) to polyol, examples of (a213) include a product obtained by polyaddition of alkylene carbonate (c3) to polyol, and examples of (a2114) include castor oil, and castor oil modified with polyol or AO.

Examples of polyol constituting them include the aforementioned (a22) and/or (a212)[preferably, having a hydroxyl group equivalent of 500 or smaller], examples of (c1) include polycarboxylic acids exemplified as the active hydrogen atom-containing compound [preferably, joint use of dicarboxylic acid and a small proportion (20% or smaller) of tri- or more-valent polycarboxylic acid], examples of (c2) include C4 to C12 lactone such as 4-butanolide, 5-pentanolide and 6-hexanolide, and examples of (c3) include C2 to C8 alkylene carbonate such as ethylene carbonate and propylene carbonate, and these may be used in combination of two or more.

(a211) can be prepared by the conventional method. (a2111) can be prepared, for example, by a dehydration polycondensation or transesterification reaction of (c1) or its ester forming derivative [acid anhydride (maleic anhydride, phthalic anhydride), lower alkyl (C1 to C4) ester (dimethyl adipate, dimethyl terephthalate etc.), acid halide (acid chloride etc.)] and an excessive equivalent of polyol, by a dehydration polycondensation or transesterification reaction of (c1) or its ester forming derivative and polyol, and thereafter, reaction with AO, or by a reaction of polyol with acid anhydride and AO. (a2112) and (a2113) can be prepared by polyaddition of (c2) or (c3) using polyol as an initiator. A modified castor oil can be prepared by transesterification of castor oil and polyol and/or AO addition.

Examples of (a2111) include polyethylene adipate diol, polybutylene adipate diol, polyhexamethylene adipate diol, polyneopentyl adipate diol, polyethylene propylene adipate diol, polyethylene butylene adipate diol, polybutylene hexamethylene adipete diol, polydiethylene adipate diol, poly(polytetramethylene ether)adipate diol, poly(3-methylpentylene adipate) diol, polyethylene azelate diol, polyethylene sebacate diol, polybutylene azelate diol, polybutylene sebacate diol, polyneopentyl terephthalate diol; examples of (a2112) include polycaprolactone diol, polyvalerolactone diol, polycaprolactone triol; examples of (a2113) include polyhexamethylene carbonate diol; examples of (a2112) include castor oil, trimethylol propane-modified castor oil, pentaerythritol-modified castor oil, and castor oil EO (4 to 30 mole) adduct.

Examples of (a213) include polyalkadiene-based polyol such as polybutadiene diol [polybutadiene having 1,2-vinyl structure and/or 1,4-trans structure (butadiene homopolymer and copolymer such as styrene butadiene copolymer, acrylonitrile butadiene copolymer) diol], and hydrogenated products thereof (hydrogenation rate: for example, 20 to 100%); and copolymers of acrylic-based polyol such as hydroxyalkyl (C2 to C6)(meth)acrylate [ethylhydroxyethyl (meth)acrylate] with other monomer [styrene, alkyl(C1 to C8)(meth)acrylate, etc.]. Examples of polybutadiene diol include NISSO-PEG series (G-1000, G-2000, G-3000 etc.) (manufactured by Nippon Soda Co., Ltd.), and Poly Bd (R-45M, R-45HT, CS-15, CN-15 etc.) (manufactured by USA ARCO).

Examples of (a214) include a polymer-containing polyol obtained by polymerizing a radical polymerizable monomer in polyol [the aforementioned (a211) and/or (a212) and, if necessary, (a22)] therein, and examples of a monomer include styrene, (meth)acrylonitrile, (meth)acrylic acid ester, vinyl chloride, and a mixture of two or more of them. Polymerization of a monomer is usually performed in the presence of a polymerization initiator. Examples of a polymerization initiator include a type which initiates polymerization by producing a free group, for examples, azo compounds such as 2,2'-azobisisobutyronitrile (AIBN), and 2,2'-azobis-(2,4-dimethylvaleronitrile) (AVN); dibenzoyl peroxide, dicumyl peroxide, and other peroxide, persulfate, perborate, and persuccinate described in JP-A No. 61-76517. An azo compound, particularly, AIBN and AVN are preferable. An amount of a polymerization initiator to be used is usually 0.1 to 20%, preferably 0.2 to 10% based on a total amount of monomers. Polymerization in polyol may be performed without a solvent, but when a polymer concentration is high, it is preferable to perform the polymerization in the presence of an organic solvent. Examples of an organic solvent include benzene, toluene, xylene, acetonitrile, ethyl acetate, hexane, heptane, dioxane, N,N-dimethylformamide, N,N-dimethylacetamide, isopropyl alcohol, and n-butanol. If necessary, polymerization can be performed in the presence of a chain transfer agent (alkylmercaptans, carbon tetrachloride, carbon tetrabromide, chloroform, enol ethers described in JP-A No. 55-31880 etc.). Polymerization can be performed at a temperature of a degradation temperature of a polymerization initiator or higher, usually 60 to 180° C., preferably 90 to 160° C., under atmospheric pressure or under pressure, or under reduced pressure. After completion of the polymerization reaction, the resulting polymer polyol can be used as such for preparing polyurethane as it is, and it is desirable to remove impurities such as an organic solvent, a product from degradation of a polymerization initiator, and an unreacted monomer by a conventional method, after completion of the reaction.

(a214) is a translucent or opaque white or claybank dispersion in which usually 30 to 70% (preferably 40 to 60%, particularly preferably 50 to 55%) of a polymerized monomer, that is, a polymer is dispersed in polyol. A hydroxyl group value of (a214) is usually 10 to 300, preferably 20 to 250, particularly preferably 30 to 200.

A hydroxyl group equivalent of (a21) is usually 150 to 5,000, preferably 250 to 3,000, particularly preferably 300 to 2,500.

Among (a2), preferable from a viewpoint of physical property of a polyurethane resin is joint use of (a21) and (a21) as well as a small proportion (e.g. 20% or smaller) of (a22). Among (a21), preferable is (a212), and particularly preferable is (a211).

As an active hydrogen atom-containing component used in a reaction with (a1), in addition to (a2), other active hydrogen atom-containing compound (a3) can be used as necessary. Examples of (a3) include an active hydrogen atom-containing polyfunctional compound (a31) and a monofunctional compound (a32). Examples of (a31) include the aforementioned polyamine, and polyetherpolyamine [hydrogenated cyanoalkylated (C2 to C4) (cyanoethylated etc.)(a212) and/or (a222)]; examples of (a32) include the aforementioned primary monoamine, secondary monoamine such as di-hydrocarbyl(C1 to C20 alkyl, cycloalkyl, aryl and/or aralkyl)amine (dibutylamine etc.) and its AO adduct, monohydric alcohol (C1 to C20 alkanol, cyclohexanol, benzyl alcohol etc.) and its AO adduct.

By using a compound (d) in which at least a part of an active hydrogen atom-containing component comprising polyol (a2) contains a hydrophilic group and an active hydrogen atom-containing group in a molecule, a self-emulsification type aqueous polyurethane resin dispersion can be obtained.

Examples of a hydrophilic group in (d) include an anionic group (sulfonic acid group, sulfamic acid group, phosphoric acid group, carboxyl group etc., and salts thereof), a cationic group (quaternary ammonium salt group, primary to tertiary amine salt group, and salts thereof) and a nonionic group (oxyethylene group, hydroxyl group etc.). Among hydrophilic groups, preferable are a sulfamic acid group, and a hydrophilic group (Q) having the number of groups inherent to an atomic entity by a Davis method of 0.3 or larger. The number of groups inherent to an atomic group by a Davis method is described on page 133 in "New Introduction to Surfactant" (manufactured by Sanyo Chemical Industries, Ltd.). Examples of Q include anionic groups such as a sodium salt of a carboxyl group (number of groups=19.1), a potassium salt of a carboxyl group (number of groups=21.1), and a sodium salt of a sulfonic acid group (number of groups=38.7); cationic groups such as a quaternary ammonium salt group, and a tertiary amine acetic acid salt group; and nonionic groups such as an oxyethylene group (number of groups=0.33), and a hydroxyl group (number of groups=0.5).

Examples of (d) include those having 1, or 2 to 8 or more active hydrogen atom-containing groups, and examples of its active hydrogen atom-containing group include a hydroxyl group, a carboxyl group and an amino group. Preferable examples include those having two or more (particularly 2) active hydrogen atom-containing groups, and joint use of this and those having one active hydrogen atom-containing group (weight ratio of joint use is 100/0 to 50/50).

Examples of (d) having an anionic group include sulfonic acid diol [3-(2,3-dihydroxypropoxy)-1-propanesulfonic acid etc.], sulfopolycarboxylic acid [sulfoisophthalic acid, sulfosuccinic acid etc.] and aminosulfonic acid [2-aminoethanesulfonic acid and 3-amino propanesulfonic acid, etc.]; sulfamic acid diol [N,N-bis(2-hydroxyalkyl)sulfamic acid (C1 to C6 of alkyl group) or its AO adduct (example of AO includes EO and PO, and an addition mole number of AOs is 1 to 6): for example, N,N-bis(2-hydroxyethyl)sulfamic acid, N,N-bis(2-hydroxyethyl)sulfamic acid PO 2 mole adduct, etc.]; bis(2-hydroxyethyl)phosphate, etc.; dialkylol alkanoic acid [C6 to C24, e.g. 2,2-dimethylol propionic acid (DMPA), 2,2-dimethylol butanoic acid, 2,2-dimethylol heptanoic acid, 2,2-dimethylol octanoic acid] and amino acid (2-aminoethanoic acid etc.); and salts thereof, for example, salts of amines (triethylamine, alkanolamine, morpholine etc.) and/or alkali metal salts (sodium salt etc.). Examples of (d) containing a cationic group include quaternary ammonium base-containing diol, tertiary amino group-containing diol and salts thereof (carboxylic acid salt etc.); examples include alkyl (C1 to C8) dialkanol(C2 to C4)amine (N-methyldiethanolamine etc.) and dialkyl(C1 to C6)alkanol(C2 to C4)amine (N,N-dimethylethanolamine etc.), as well as products obtained by neutralizing with these acids [organic acids such as C1 to C8 carboxylic acid (acetic acid etc.), sulfonic acid (toluenesulfonic acid etc.); inorganic acids such as hydrochloric acid, sulfuric acid, phosphoric acid etc.] and products obtained by quaternarization with a quaternarizing agent [sulfate ester, carbonate ester, and halide having C1 to C8 alkyl group or benzyl group (dimethyl sulfate, dimethyl carbonate, methyl chloride, benzyl chloride etc.)]. Examples of an ionic group (anionic group or cationic group) containing aqueous polyurethane resin dispersion include those described in JP-B No.42-24192 and JP-B No.43-9076.

Examples of (d) having a nonionic group include PEG and polyethylenepropylene glycol (Mn=100 to 3,000). Nonionic (d) and anionic (d) or cationic (d) may be used jointly.

A content of (d) in a self-emulsification type (U) aqueous dispersion is preferably 0.1% or larger, further preferably 0.5 to 30% based on a weight of a polyurethane resin. In particular, when (d) is a nonionic compound, a content is preferably 3 to 30% [when (a211) or (a212) is used and a polyoxyethylene chain (addition mole number 2 or larger) is contained therein, a weight thereof is also included], preferably 5 to 20%. A weight of (d) when (d) is an ionic compound is preferably 0.1 to 10%, further preferably 0.5 to 5% based on a weight of a polyurethane resin. When this is converted into equivalent, a weight is preferably 0.01 to 2 meq/g, further preferably 0.05 to 1 meq/g.

A self-emulsification type (U) aqueous dispersion can be prepared, for example, by charging an H component comprising (a1), (a2) containing (d) and, if necessary, a terminating agent (e1) and, if necessary, an organic solvent, forming a urethane prepolymer at one stage or a multiple stage, then, after the prepolymer is hydrophilized (neutralized or quaternarized), or while hydrophilizing, mixing the prepolymer with an aqueous medium, if necessary, containing a chain extender (f), a crosslinking agent (x) and/or a terminating agent (e2) to obtain an aqueous dispersion, and performing a reaction [chain extension with water or (f) and, if necessary, crosslinking with (x) and/or reaction termination with (e2)] until a NCO group is substantially consumed. Hydrophilization (neutralization or quaternarization) may be performed after formation of an aqueous dispersion. When chain extension with (f) and, if necessary, reaction termination with (x) and/or (e2) are performed, it is preferable that a prepolymer is dispersed in an aqueous medium and, thereafter, (f) and, if necessary, (x) and/or (e2) are added to react with a prepolymer.

Alternatively, a (U) aqueous dispersion may be formed by reacting (a1) and the aforementioned H component in the presence of an organic solvent to form a prepolymer solution, and reacting with a chain extender (f) and, if necessary, a crosslinking agent (x) and/or a terminating agent (e2), or by reacting (a1) and the aforementioned H component and, if necessary, a crosslinking (x) and/or a terminating agent (e2) in the presence of an organic solvent, at one stage, whereby, a solution of (U) in an organic solvent is formed, and is dispersed in an aqueous medium. Also in this case, hydrophilization (neutralization or quaternarization) may be performed before formation of an aqueous dispersion, during a stage of formation, or after formation.

A prepolymer is formed by reacting (a1) and an H component at such a proportion that an equivalent ratio of an isocyanate group/an active hydrogen-containing group (except for carboxyl group) is usually 1.01 to 2, preferably 1.1 to 1.6. An amount of (e1) which is added to an H component as necessary is usually 5% by equivalent or smaller, preferably 3% by equivalent or smaller. Formation of a prepolymer is performed by a reaction at usually 20° C. to 150° C., preferably 60° C. to 110° C., and a reaction time is 2 to 10 hours. Formation of a prepolymer can be performed in the presence or the absence of an organic solvent which is substantially unreactive with a NCO group. A prepolymer has a free NCO group content of usually 0.5 to 5%. Hydrophilization of a prepolymer can be performed using a base [when (d) is anionic compound] or an acid or a quaternarizing agent [when (d) is cationic compound]. An aqueous dispersion can be formed by mixing and dispersing a prepolymer with an aqueous medium [water or a mixture of water and a hydrophilic organic solvent, if necessary, containing (f), (x) and/or (e)] at usually 10° C. to 60° C., preferably 20° C. to 40° C., to react them, and distilling off the organic solvent as necessary.

Examples of an organic solvent used upon the aforementioned reaction, and a hydrophilic solvent to be contained in an aqueous medium include solvents which are substantially unreactive with a NCO group, and hydrophilic (water-miscible) solvents (ketones, esters, ethers, amides, alcohols), respectively, among organic solvents exemplified above (a214). A ratio of water and a hydrophilic solvent is usually 100/0 to 50/50, preferably 100/0 to 80/20, particularly preferably 100/0.

As a chain extender (f) and a crosslinking agent (x), polyamines [(h32) as described above] can be used. Amounts of (f) and (x) to be used is such an amount that primary and secondary amino groups of (f) and (x) are usually 0.5 to 2 equivalent, preferably 0.9 to 1.2 equivalent relative to 1 equivalent of an isocyanate group remaining in a prepolymer. Examples of a terminating agent (e1) include monofunctional compounds [(a32) as described above: primary monoamine, secondary monoamine, monohydric alcohol, and monofunctional compounds among (d)]; examples of a terminating agent (e2) include the aforementioned monofunctional compounds, and [(h312) as described above: mono- and di-alkanolamine, etc.]. An amount of (e2) to be used is usually 0.5 equivalent or smaller, preferably 0.03 to 0.3 equivalent relative to 1 equivalent of a free NCO group of a prepolymer. (e2) may be contained in an aqueous medium, or may be added at a stage of chain extension of a prepolymer.

By using (d) as at least a part of (e1) and/or (e2), in place of or in addition to use of (d) as at least a part of (a2), a self-emulsification type (U) aqueous dispersion may be prepared.

A (U) aqueous dispersion may be converted into an emulsifier-emulsified type (U) aqueous dispersion using an emulsifier.

An emulsifier-emulsified type (U) aqueous dispersion can be prepared by forming a prepolymer in the presence or the absence of an organic solvent, mixing the prepolymer with an aqueous medium to obtain an aqueous dispersion, performing a reaction [chain extension and, if necessary, crosslinking and/or reaction termination], and distilling an organic solvent off, if necessary, according to the same manner as that described above except that an emulsifier is used, in place of, in addition to use of (d) as at least a part of (a2) [or (e1) and/or (e2)].

An emulsifier may be added to either or both of a prepolymer and an aqueous medium. When an emulsifier is reactive with a prepolymer, it is preferable to add the emulsifier to an aqueous medium. An amount of an emulsifier to be added is usually 0.2 to 10%, preferably 0.3 to 6% based on a weight of a urethane prepolymer. When (d) is used, the amount may be an amount smaller than the aforementioned range, depending on an amount of (d).

Examples of an emulsifier include anionic, cationic, nonionic and amphoteric surfactants, polymer-type emulsification dispersant, and joint use of two or more of them, for example, those described in U.S. Pat. No. 3,929,678 and U.S. Pat. No. 4,331,447.

Examples of an anionic surfactant include ether carboxylic acid having a C8 to C24 hydrocarbon group or a salt thereof [lauryl ether sodium acetate, (poly)oxyethylene [polymerization degree (hereinafter, abbreviated as p)=1 to 100] lauryl ether sodium acetate etc.], sulfate ester or ether sulfate ester having a C8 to C24 hydrocarbon group and salts thereof [sodium laurylsulfate, (poly)oxyethylene (p=1 to 100) sodium laurylsulfate, (poly)oxyethylene (p=1 to 100) laurylsulfate triethanolamine, (poly)oxyethylene (p=1 to 100) palm oil fatty acid monoethanolamide sodium sulfate etc.], sulfonate salt having a C8 to C24 hydrocarbon group [sodium dodecylbenzenesulfonate etc.], sulfosuccinate salt having one or two C8 to C24 hydrocarbon group(s), phosphate ester or ether phosphate ester having a C8 to C24 hydrocarbon group, and salts thereof [sodium laurylphosphate, (poly)oxyethylene (p=1 to 100) sodium laurylether-phosphate etc.], fatty acid salt having a C8 to C24 hydrocarbon group [sodium laurate, lauric acid triethanolamine etc.] and acylated amino acid salt having a C8 to C24 hydrocarbon group [sodium palm oil fatty acid methyltaurine, sodium palm oil fatty acid sarcosine, palm oil fatty acid sarcosine triethanolamine, N-palm oil fatty acid acyl-L-glutamic acid triethanolamine, sodium N-palm oil fatty acid acyl-L-glutamate, lauroylmethyl-β-alanine sodium etc.]; examples of a nonionic surfactant include aliphatic alcohol (C8 to C24)AO(C2 to C8) adduct (p=1 to 100), polyhydric (dihydric to decahydric or more-hydric) alcohol fatty acid (C8 to C24)ester [GL monostearate, sorbitan monolaurate etc.], fatty acid (C8 to C24)alkanolamide [1:1 type palm oil fatty acid diethanolamide, 1:1 type lauric acid diethanolamide etc.], (poly)oxyalkylene(C2 to C8, p=1 to 100)alkyl (C1 to C22)phenylether, (poly)oxyalkylene(C2 to C8, p=1 to 100)alkyl(C8 to C24)amine and alkyl(C8 to C24)dialkyl(C1 to C6)amine oxide (lauryldimethylamine oxide etc.); examples of a cationic surfactant include quaternary ammonium salt type [stearyltrimethylammonium chloride, behenyltrimethylammonium chloride, distearyldimethylammonium chloride, ethyl sulfate lanolin fatty acid aminopropylethyldimethylammonium etc.], amine salt type [stearic acid diethylaminoethylamide lactate, dilaurylamine hydrochloride, oleylamine lactate etc.]; examples of an amphoteric surfactant include betaine type amphoteric surfactant [palm oil fatty acid amidopropyldimethylaminoacetic acid betaine, lauryldimethylaminoacetic acid betaine, 2-alkyl-N-carboxymethyl-N-hydroxyethylimidazolinium betaine, laurylhydroxysulfobetaine, lauroylamidoethylhydroxyethylcarboxymethylbetaine sodium hydroxypropylphosphate etc.], and amino acid amphoteric surfactant [sodium β-laurylaminopropionate etc.].

Examples of a polymer-type emulsification dispersant include polyvinyl alcohol, starch and a derivative thereof, cellulose derivative such as carboxymethylcellulose, methylcellulose and hydroxyethylcellulose, carboxyl group-containing (co)polymer having Mn=1,000 to 50,000 such as sodium polyacrylate, and polymer-type dispersants having a urethane bond or an ester bond described in U.S. Pat. No. 5,906,704 [e.g. dispersant in which polycaprolactonepolyol (a2112) and polyetherdiol (a2121) are linked with polyisocyanate (a1)] can be used.

Among these emulsifiers, preferable are a nonionic surfactant and a polymer-type emulsification dispersant, in particular, a polymer-type emulsification dispersant having a urethane bond or an ester bond described in the aforementioned gazette.

A weight average particle diameter of the (U) aqueous dispersion in the present invention is usually 0.01 to 4 μm, preferably 0.01 to 3 μm.

In the aforementioned urethanating reaction, in order to promote the reaction, a catalyst which is used in a normal urethanating reaction may be used, if necessary. Examples of the catalyst include an amine-based catalyst such as triethylamine, N-ethylmorpholine, triethylenediamine, and cycloamidines [1,8-diaza-bicyclo(5,4,0)undecene-7 (manufactured by San apro LTD., DBU) etc.] described in U.S. Pat. No. 4,524,104; tin system catalysts such as dibutyltin dilaurate, dioctyltin dilaurate and tin octylate; titanium system catalysts such as tetrabutyl titanate.

An apparatus for emulsification-dispersing a solution of a prepolymer or (U) in an aqueous medium is not particularly limited, but the following format emulsifiers are exemplified: 1) anchor agitator type, 2) rotator stator type [e.g. "Ebara Milder" (manufactured by Ebara Corporation)], 3) line mill type [e.g. line flow mixer], 4) static tube mixing type [e.g. static mixer], 5) vibration type [e.g. "VIBRO MIXER" (manufactured by Reika Kogyo)], 6) ultrasonic shock type [e.g. ultrasound homogenizer], 7) high pressure impact type [e.g. Gaulin homogenizer (Gaulin)], 8) membrane emulsification type [e.g. membrane emulsification module], and 9) centrifugation thin layer contact type [e.g. fill mix]. Among them, preferable are 5), 8) and 9).

When chain extension with (f) and, if necessary, crosslinking with (x) and/or reaction termination with (e2) are performed, it is preferable to disperse a prepolymer in an aqueous medium using a continuous type emulsifier [preferably, the aforementioned 2), e.g., Ebara Milder], and adding (f), if necessary, (x) and/or (e2) to mix them using a batch type emulsifier [preferably, the aforementioned 1)] anchor-agitator type], to react with a prepolymer.

Mn of (U) is usually 2,000 to 2,000,000 or larger, preferably 10,000 to 1,500,000, particularly preferably 100,000 to 500,000 in the case of non-crosslinked (thermoplastic) (U). Crosslinked (U) may have Mn higher than the aforementioned range, or Mn which is too high to be measured by GPC.

Examples of a process for preparing aqueous dispersions (I) and (II) of a resin having at least two peaks in a particle diameter distribution curve of the present invention include I) a method of separately preparing an aqueous dispersion of a resin (A1) and an aqueous dispersion of other resin (A2) having two or more different particle diameters, and then mixing them; II) a method of dispersing a solution or a melt of other resin (A2) or a precursor of (A2p) in an aqueous dispersion of a resin (A1) and, in the case of (A2p), further converting into (A2), to prepare a dispersion containing particles comprising (A2) having a different particle diameter from that of (A1) III) a method of dispersions having two or more different particle diameters at the same time; and IV) a method of a combination of two or more of the aforementioned I) to III). From a viewpoint of productivity, preferable are I), IV) and, in particular, II).

In the method of II), examples of a combination of (A1) and (A2) or a precursor thereof include the case where (A1) is (U), (E), (M) or (D), and (A2p) is a urethane prepolymer, and the case where (A1) is (U), (E), (M) or (D), and (A2) is (E). Among them, preferable is the case where (A1) is (U), (E) or (M), and (A2p) is a urethane prepolymer (U2p), in particular, the case where (A1) is (U), and (A2p) is (U2p).

Processes for preparing aqueous dispersions (I) and (II) may be batch manner or continuous manner. From a viewpoint of productivity, preferable is continuous manner. Preparation of a dispersion of a resin (A1) and the aforementioned method of II) may be performed in a continuous manner; it is preferable to continuously disperse a precursor (Alp) of a resin (A1) in an aqueous medium to form a dispersion of (Alp), mixing this with (f), if necessary, (x) and/or (e2) in a batch manner to react them, to form a dispersion of (A1), and continuously disperse a solution or a melt of (A2) or (A2p) therein according to the aforementioned method II).

Aqueous dispersions (I) and (II) of (U) can be prepared by preparing an aqueous dispersion of a polyurethane resin (U1) in advance by the aforementioned self-emulsification type or emulsifier emulsified type method, according to the aforementioned method of II), thereafter introducing a liquid (melt or solution-like) urethane prepolymer (U2p) using an emulsifying machine in the state where the aqueous dispersion is flown or stirred, to disperse it and, at the same time, or thereafter, performing a chain extension reaction with water, or adding (f) to perform a chain extension reaction, to convert (U2p) into a polyurethane resin (U2).

It is preferable that an aqueous dispersion of (U1) is such that (F) is added to an aqueous dispersion of a precursor of (U1) (U1p), and (U1p) is chain-extended. When (U1p) is chain-extended, a standard deviation, a skewness and a kurtosis of a peak of the aforementioned particle diameter distribution curve are easily in preferable ranges. In this case, although a chain extension reaction may be performed by either of a continuous reaction apparatus or a batch reaction apparatus, it is preferable to perform the reaction by a batch reaction apparatus from a viewpoint of easy completion of the reaction.

Alternatively, (U2) may be formed by adding (f) to an aqueous dispersion of (U1) in advance, dispersing (U2p), and performing chain extension at the same time with dispersing of (U2p).

As an emulsification dispersing apparatus, any of the aforementioned vibration type, membrane emulsification type and centrifugation thin membrane contact type may be used.

When a solution of a resin or a precursor is used, an organic solvent may be distilled off as necessary.

When a resin (A) is (U), examples of means to make the aforementioned (U2p) a dispersion of (U2) having a different particle diameter from that of an aqueous dispersion of (U1) [e.g., (U2) has a larger particle diameter] include 1) when (U2p) is a self-emulsification type urethane prepolymer, reduction in an amount of its hydrophilic group [amount of (d)]; 2) when (U2p) is an emulsifier-emulsified urethane polymer, reduction in an amount of an emulsifier to be added; 3) when a dispersion of (U2) or (U2p) contains a hydrophilic organic solvent, reduction in a content thereof; 4) reduction in a shear force at emulsification of a urethane prepolymer; and a combination of two or more of them.

An amount of (d) in (U2p) in the case of 1) is preferably 20% or smaller, further preferably 10% or smaller, particularly preferably 5% or smaller, based on a weight of (U2p), and is preferably 70% or smaller, particularly 50% or smaller of a content of (d) in (U1). An amount of an emulsifier to be added in the case of 2) is preferably 6% or smaller, particularly preferably 0.2 to 5% based on a weight of (U2p), and preferably 70% or smaller, particularly 50% or smaller of an amount of an emulsifier to be added in an aqueous dispersion of (U1). In the case of 3), an amount of a hydrophilic organic solvent to be added is preferably 10% or smaller, particularly preferably 0.3 to 8% based on a weight of (U2) or (U2p), and preferably 70% or smaller, particularly 50% or smaller of an amount of a hydrophilic organic solvent to be added in an aqueous dispersion of (U1).

In aqueous dispersions (I) and (II) of (U), any of at least two particle diameters may be larger, but it is preferable that a particle diameter of a particle formed from a liquid urethane prepolymer is larger, from a viewpoint of easy preparation.

Examples of a polyaddition type resin include, besides (U), a polythiourethane resin such as a polyaddition product of polyisothiocyanate [compound corresponding to the aforementioned (a1)(in which NCO group is substituted with NCS group)] and an H component comprising polyol [aforementioned (a2)]; a poly(thio)urea resin such as a polyaddition product of polyamine [aforementioned (h32) and/or (a312)] and polyiso(thio)cyanate (aforementioned (a1) and/or aforementioned polyisothiocyanate); polymethylenemalonamide such as a polyaddition product of diketene and polymethylenediamine, a polyaddition product of dithiol [aforementioned (h6) such as hexamethylenedithiol] and a divinyl compound (alkadiene, dicarboxylic acid divinyl ester etc. described below).

A process for preparing aqueous dispersions of these polyaddition type resins, a preferable content of (d) in a self emulsification type resin and an amount of an emulsifier to be used in an aqueous dispersion of an emulsifier-emulsified type resin, a weight average molecular diameter of an aqueous dispersion of a resin, Mw of a resin, and processes for preparing aqueous dispersions (I) and (II) are the same as those described in (U).

A resin (E) includes a polycondensate of polyols and polycarboxylic acid and a polycondensate of oxycarboxylic acid, and the latter includes polylactone.

Examples of polyols include the aforementioned (a22) and/or (a212). Preferable is joint use of an aliphatic dihydric to tetrahydric alcohol and two or more of these, and further preferable is joint use of a dihydric alcohol (in particular, at least one kind selected from NPG, BEPD and HD) and a trihydric alcohol and/or tetrahydric alcohol (particularly, TMP and/or PE). From a viewpoint of a hardness of the resulting coated film and a viscosity of a paint, a ratio of both of them is preferably 99.5/0.5 to 70/30, particularly 98/2 to 80/20.

Examples of polycarboxylic acid include the aforementioned (h4). Preferable are C2 to C10 aliphatic dicarboxylic acid, C8 to C18 aromatic dicarboxylic acid, C9 to C18 trivalent to tetravalent or more-valent aromatic polycarboxylic acid, and joint use of two or more of them. Further preferable are aliphatic dicarboxylic acid (particularly, adipic acid and/or sebacic acid), aromatic divalent to tetravalent carboxylic acid (particularly, at least one selected from isophthalic acid, terephthalic acid and trimellitic acid) and, particularly, joint use of them (ratio 20/80 to 50/50).

Examples of oxycarboxylic acid include C4 to C12 hydroxyalkanoic acid, for example, acid corresponding to the aforementioned (c2).

(E) can be prepared by the conventional polyester forming method, for example, by esterifying or transesterifying polyols and polycarboxylic acid or its ester forming derivative [e.g. acid anhydride, lower alkyl(C1 to C4)ester etc.], by polycondensing oxycarboxylic acid, or by reacting an initiator (oxycarboxylic acid, polyols and/or polycarboxylic acid, or its partial polycondensate) with (c2) (e.g. ε-caprolactone) or acid anhydride and AO.

Esterification or transesterification can be performed at a reaction temperature of usually 100 to 250° C., if necessary, using a catalyst and/or a solvent. As a catalyst and a solvent, those which are conventionally used in a polyesterification reaction can be used. Examples of a catalyst include dibutyltin dilaurate, tin octylate, p-toluenesulfonic acid, and lithium naphthenate; examples of a solvent include aromatic hydrocarbons and ketones exemplified in the aforementioned (a214).

A process for preparing an aqueous dispersion of (E) is not particularly limited. An aqueous dispersion of an emulsifier-emulsified type (E) can be prepared by the same process as that for preparing an aqueous dispersion of the aforementioned emulsifier-emulsified type (U) using the same emulsifier. In addition, an aqueous dispersion of self-emulsification type (E) can be prepared by using jointly a compound having a hydroxy group as an active hydrogen atom-containing group (PEG, EO adduct of bisphenol A, dialkylolalkanoic acid, sulfonic acid diol) among the aforementioned (d) as at least a part of polyols. Alternatively, it can be prepared by using jointly, for example, polycarboxylic acid (d1) having an anionic group other than a carboxyl group [e.g. sulfoisophthalic acid (salt) and its ester forming derivative] as polycarboxylic acids.

A preferable content of (d) in self-emulsification type (E) and an amount of an emulsifier to be used in an aqueous dispersion of emulsifier-emulsified type (E) are the same as those in (U).

A weight average particle diameter of the aqueous dispersion of (E) obtained in these methods is usually 0.01 to 4 μm, preferably 0.01 to 3 μm. Mw of (E) is usually 2,000 to 2,000,000 or larger, preferably 10,000 to 1,500,000.

Aqueous dispersions (I) and (II) of (E) can be prepared by preparing an aqueous dispersion of a polyester resin (E1) in advance by the aforementioned emulsifier-emulsified type or self-emulsification type method, according to the aforementioned method of II), and then introducing a solution-like or melt-like polyester resin (E3) of a solution of an aqueous dispersion of (E1) in the state where the aqueous dispersion is flown or stirred by using emulsifying machine, to disperse therein.

In this case, in order that (E2) is a dispersion having a different average particle diameter from that of an aqueous dispersion of (E1) [e.g. (E2) has a larger particle diameter], a method of reducing an amount of (d), an emulsifier and/or a hydrophilic solvent is used as in the case of an aqueous dispersion of (U).

Examples of a polyamide resin include a polycondensate of polyamine and polycarboxylic acid, a polycondensate of aminocarboxylic acid, and polyesterpolyamide obtained by copolycondensing a polyamide forming component (polyamine and polycarboxylic acid or aminocarboxylic acid) and polyols.

Examples of polyamine include the aforementioned (h32) and/or (a312). Preferable is diamine, in particular, hexamethylenediamine.

Examples of polycarboxylic acid include the aforementioned (h4). Preferable are C2 to C10 aliphatic dicarboxylic acid, C8 to C18 aromatic dicarboxylic acid, C9 to C18 trivalent to tetravalent or more-valent aromatic polycarboxylic acid, and joint use of two or more of them, and further preferable are aliphatic dicarboxylic acid (particularly, adipic acid and/or sebacic acid), and aromatic dicarboxylic acid (particularly, isophthalic acid and/or terephthalic acid).

Examples of aminocarboxylic acid include C4 to C 12 aminoalkanoic acid such as ω-capronamino acid, ω-aminoenanthic acid, ω-aminocaprylic acid, ω-aminopelargonic acid, ω-aminocapric acid, ω-aminoundecanoic acid and 12-aminododecanoic acid.

As polyols, used for forming polyesterpolyamide, the aforementioned (a22) and/or (a212) can be used.

Polyamide can be prepared by the conventional polyamide forming method, for example, by polycondensation of polyamine and polycarboxylic acid, by polycondensation of aminocarboxylic acid, or by reacting an initiator (aminocarboxylic acid, polyamine and/or polycarboxylic acid, or its partial polycondensate) with lactam (e.g. at least one of caprolactam, enanthlactam, capril lactam, and laurolactam).

Polyesterpolyamide can be prepared, for example, by a method of copolycondensing polyols in addition to the aforementioned polyamide forming component, to introduce an ester bond, or by a method of reacting carboxyl group (or its ester forming derivative group)-containing polyamide and polyols.

A process for preparing an aqueous dispersion of polyamide is not particularly limited. An aqueous dispersion of an emulsifier-emulsified type polyamide can be prepared by the same process as that for preparing an aqueous dispersion of the aforementioned emulsifier-emulsified type (U) using the same emulsifier. An aqueous dispersion of self-emulsification type polyamide can be prepared by using, as at least a part of polyamine and/or polycarboxylic acid, (d) having amino group as an active hydrogen atom-containing group among the aforementioned (d) [such as bis(3-aminopropyl) methylamine, 3,4-diaminobenzoic acid, diaminotoluenesulfonic acid, a salt thereof, polyoxyethylene chain-containing polyamine (diaminoethyl ether of PEG etc.)], and polycarboxylic acid (d1) having an anionic group other than a carboxylic group [e.g. sulfoisophthalic acid (salt) and its ester forming derivative]. In addition, an aqueous dispersion of self-emulsification type polyesterpolyamide can be prepared by using (d) having a hydroxyl group as an active hydrogen atom-containing group among (d) (PEG, EO adduct of bisphenol A, dialkylolalkanoic acid, sulfonic acid diol etc.), and reacting this with a polyamide forming component or carboxyl group (or its ester forming derivative group)-containing polyamide.

A preferable content of (d) in self-emulsification-type polyamide, an amount of an emulsifier to be used in an aqueous dispersion of emulsifier-emulsified type polyamide, a weight average molecular diameter of an aqueous dispersion of polyamide, Mw of polyamide, and processes for preparing aqueous dispersions (I) and (II) are the same as those in (E).

Examples of a polycondensation type resin include, besides the aforementioned polycondensation type resins, a silicone resin; a polycarbonate resin; a polyimide resin such as a polycondensate of pyromellitic dianhydride and diamine [aforementioned (h32): hexamethylenediamine, nonamethylenediamine etc.]; a polybenzimidazole resin such as a polycondensate of tetraaminobiphenyl and dicarboxylic acid [aforementioned (h4): sebacic acid etc.]; a polyurea resin such as a polycondensate of urea and diamine [aforementioned (h32)]; a polysulfonamide resin such as a polycondensate of benzyldisulfonylchloride and diamine [aforementioned (h32): hexamethylenediamine etc.]; a polysulfonate copolymer such as a polycondensate of bisphenols (bisphenol A etc.) and two kinds of aromatic disulfonyl chlorides (one kind may be carboxylic acid chloride); a polysulfone resin such as a polycondensate of bisphenols (bisphenol A etc.) and dichiorodiphenylsulfone; a polysulfide resin such as a polycondensate of sodium polysulfide and dichloro compound (ethylene dichloride, ethylene ether dichloride); a poly-p-phenylene resin.

Examples of a silicone resin include organopolysiloxane such as polydimethylsiloxane, polymethylphenylsiloxane, methylstyrene-modified silicone, olefin-modified silicone, fluorine-modified silicone, and hydrophilic group-modified silicone (polyether-modified silicone, alcohol-modified silicone, amino-modified silicone, mercapto-modified silicone, epoxy-modified silicone, carboxyl-modified silicone, etc.).

Examples of a polycarbonate resin include polycarbonate resins synthesized [prepared by a reaction with alkylene carbonate (c3) (polyaddition and transesterification), transesterification with diphenyl carbonate, or phosgenization] from a dihydroxyl compound [e.g. aforementioned (a221) divalent alcohol, aforementioned (h2) divalent phenol, and AO adduct thereof]. Specific examples include polycarbonates synthesized from bisphenols such as 4,4'-dihydroxydiaryl(cyclo)alkane and the alkane substituted with a halogen [bisphenol A, 4,4'-dihydroxydiphenyl-2,2-butane, 4,4'-dihydroxydiphenyl-2,2-(4-methyl)pentane, 4,4'-dihydroxydiphenyl-1,1-cyclohexane, 4,4'-dilhydroxy-3,3',5,5'-tetrachlorodiphenyl-2,2-propane etc.]. Preferable is polycarbonate of bisphenol A.

A process for preparing aqueous dispersions of these polycondensation system resins, a preferable content of (d) in a self-emulsification-type resin, an amount of an emulsifier to be used in an aqueous dispersion of an emulsifier-emulsified type resin, a weight average particle diameter of an aqueous dispersion of a resin, Mw of a resin, and processes for preparing aqueous dispersions (I) and (II) are the same as those in (E).

Examples of an addition condensation type resin include a phenol resin such as a condensate of phenols [phenol, cresol, xylenol, alkyl (C2 to C10) phenol, p-chlorophenol etc.] and formaldehyde (novolak and resol); and an amino resin such as a condensate of an amino group -containing compound [(thio)urea, ethyleneurea, melamine, dicyandiamide, benzoguanamine, aniline, toluenesulfonamide etc.] and formaldehyde (urea resin, melamine resin etc.). Mw of them is usually 2,000 to 2,000,000 or larger, preferably at least 10,000.

Examples of an epoxy-based resin include epoxy-based resins described in British Patent No. 1543099, U.S. Pat. Nos. 5238767 and 5162437, and "Epoxy Resins" (published by McGraw-Hill in 1957), a glycidyl type epoxy resin (diglycidyl ether of bisphenol A etc.) and a non-glycidyl type epoxy resin (alicyclic epoxy resin etc.). Mw of an epoxy resin is usually 100 to 10,000 or larger, preferably 200 to 5,000, and an epoxy equivalent is usually 50 to 5,000 or larger, preferably 200 to 2,500. An epoxy resin can be cured by the normally used curing agent such as polyamine [aforementioned (h32)], polycarboxylic acid (anhydride) [aforementioned (h4), or its anhydride] or the like. Mw of a cured product is usually 2,000 to 2,000,000 or larger, preferably at least 10,000.

A process for preparing an aqueous dispersion of these resins, a preferable content of (d) in a self-emulsification-type resin, an amount of an emulsifier to be used in an aqueous dispersion of an emulsifier-emulsified type resin, a weight average particle diameter of an aqueous dispersion of a resin, and processes for preparing aqueous dispersions (I) and (II) are the same as those in (U). An epoxy resin may be cured upon formation of an aqueous dispersion or after formation, or a pre-cured epoxy resin may be dispersed in an aqueous medium, and particles comprising a cured epoxy resin (A2) having a different particle diameter from that of (A1) can be prepared by dispersing using an epoxy resin as a precursor (A2p) by the aforementioned method of II), and curing the dispersion with a curing agent.

The aqueous dispersions [(I) and (II)] of the present invention include, in addition to aqueous dispersions having different particle diameters comprising the same type resins as described above, aqueous dispersions comprising at least two different type resins selected from the group consisting of a polyaddition type resin, a polycondensation type resin, an addition condensation type resin and a ring-opening-polymerization type resin [e.g. a combination of (U) and (E) and/or polyamide resin and/or phenol resin, a combination of (E) and polyamide resin and/or phenol resin]. These aqueous dispersions can be prepared by any of the aforementioned I) to IV) methods.

In addition, the aqueous dispersions [(I) and (II)] of the present invention include aqueous dispersions comprising particles of at least one resin selected from the group consisting of a polyaddition type resin, a polycondensation type resin, an addition condensation type resin and a ring-opening-polymerization type resin, and particles of at least one resin selected from the group consisting of addition polymerization type resins [vinyl-based resin (V)].

Examples of the resin (V) include one or more (co)polymer(s) of polymerizable unsaturated monomer(s). The polymerizable unsaturated monomer includes the following:

(1) (Meth)acrylic Acid Ester (1-1) Hydrocarbyl(C1 to C20) (meth)acrylate such as (cyclo)alkyl (meth)acrylate [methyl, ethyl, propyl, butyl, pentyl, hexyl, cyclohexyl, 2-ethylhexyl and lauryl (meth)acrylates etc.], and aromatic ring-containing (meth)acrylate [benzyl (meth)acrylate etc.];

(1-2) Hydroxy group and/or ether bond-containing (meth)acrylate:(meth)acrylate of polyol [aforementioned (a22) and/or (a212), preferably having a hydroxyl group equivalent of 600 or smaller] such as mono(meth)acrylate of diol [C2 to C12 aliphatic dihydric alcohol, its AO adduct (addition mole number 1 to 20) and dihydric phenol AO adduct (addition mole number 2 to 20) such as EG, PEG (p=2 to 20), PPG (p=2 to 20) and bisphenol A EO adduct], and mono(meth)acrylate of trihydric to octahydric or more-hydric polyol [aliphatic polyhydric alcohol (GL, TMP, PE, sorbitol etc.), its AO adduct (addition mole number 1 to 20) etc.]; (meth)acrylate of hydrocarbyl(C1 to C20)ether of the aforementioned polyol, such as methoxyPEG (meth)acrylate; carboxylic acid [C1 to C30 monocarboxylic acid such as aliphatic monocarboxylic acid (formic acid, acetic acid, oleic acid, acetoacetic acid etc.), alicyclic monocarboxylic acid (cyclohexanecarboxylic acid, abietic acid etc.), aromatic monocarboxylic acid in which a nucleus may be substituted (substitution degree 1 to 3) with an alkyl group (C1 to C10) and/or halogen (Cl, Br etc.) (benzoic acid, toluic acid, xylenecarboxylic acid, 4-butylbenzoic acid, 2-methyl-4-chlorobenzoic acid, nonylbenzoic acid etc.)] ester of mono(meth)acrylate of the aforementioned polyol [mono(meth)acrylate of dihydric alcohol etc.], such as (meth)acryloyloxyethyl and (meth)acryloyloxypropylacetyl acetate; and polyfunctional (meth)acrylate, such as poly(meth)acrylate of the aforementioned polyol [di(meth)acrylate of dihydric alcohol etc.];

(1-3) Cationic group (amino group or quaternary ammonium base)-containing (meth)acrylate: primary to tertiary amino group-containing (meth)acrylate, such as amino(hydroxyl)alkyl(C2 to C4) (meth)acrylate [aminoethyl, aminopropyl and 3-amino-2-hydroxy-propyl (meth)acrylate etc.], (di)alkyl(C1 to C4)aminoalkyl (C2 to C4) (meth) acrylate [(di) methylaminoethyl, (di)ethylaminoethyl, (di)methylaminopropyl and 3-(di)methylamino-2-hydroxy-propyl (meth)acrylate], and heterocyclic amino-containing (meth)acrylate [morpholinoalkyl(C2 to C4) (meth)acrylate such as morpholinoethyl (meth)acrylate, piperidinoalkyl(C2 to C4)

such as piperidinoethyl (meth)acrylate etc.]; products obtained by neutralizing or quaternarizing them [products obtained by neutralizing or quaternarizing with acids or quaternarizing agents exemplified in (d) containing the aforementioned cationic group], such as (meth)acryloyloxyethyltrialkyl(C1 to C4)ammonium salts (chloride, methsulfate, acetate etc.); and (1-4) Anionic group (carboxyl group or sulfo group)-containing (meth)acrylate, such as lactone (C3 to C12) adduct (addition mole number 1 to 10) of (meth)acrylic acid [ε-caprolactone 1 to 5 mole adduct of (meth)acrylic acid] and sulfoalkyl(C2 to C4) (meth)acrylate [sulfopropyl (meth)acrylate etc.]; a salt thereof such as a salt of amines (triethylamine, alkanolamine, morpholine etc.) and/or alkali metal salt (sodium etc.);

(2) Carboxyl group-containing monomer: unsaturated monocarboxylic acid such as (meth)acrylic acid, (iso)crotonic acid and cinnamic acid; unsaturated dicarboxylic acid such as maleic acid, fumaric acid, itaconic acid, citraconic acid and mesaconic acid; monoalkyl(C1 to C20)ester of unsaturated dicarboxylic acid, such as maleic acid monomethyl ester, maleic acid monoethyl ester and itaconic acid monobutyl ester; unsaturated carboxylic anhydride, such as maleic anhydride and itaconic anhydride; salts of these unsaturated carboxylic acids such as the same salts as those of the aforementioned (1-4);

(3) Amide group-containing monomer: (meth)acrylamide; N-hydroxyalkyl or hydrocarbyl(C1 to C20)-substituted (meth)acrylamide, such as N-methylol(meth)acrylamide, N-alkyl and N, N-dialkyl(meth)acrylamide [N-butyl (meth)acrylamide etc.], (meth)acrylformamide, N-methyl-N-vinylacetamide, methyl α-acetoaminoacrylate, N-vinylpyrrolidone; cationic group (amino group or quaternary ammonium salt group)-containing (meth)acrylamide, such as (meth)acrylamide corresponding to the aforementioned (1-3) [(meth)acrylamidoethyltrialkyl(C1 to C4)ammonium salt etc.]; anionic group (carboxyl group or sulfo group)-containing (meth)acrylamide, such as (meth)acrylamidoalkyl(C2 to C4)sulfonic acid [(meth)acrylamidopropylsulfonic acid etc.], lactam(C3 to C12) adduct (addition mole number 1 to 10) of (meth)acrylic acid [ε-caprolactam 1 to 5 mole adduct of (meth)acrylic acid etc.], salts thereof such as the same salts as those of the aforementioned (1-4); polyfunctional (meth)acrylamide, such as methylenebis(meth)acrylamide;

(4) Aromatic unsaturated hydrocarbon: styrene-based monomer, such as ST, hydrocarbyl-substituted ST (α- and o-methylST, vinyltoluene, ethylST, dimethylST, isopropylST, butylST, phenylST, cyclohexylST, benzylST, α-methylSTdimer etc.), crotylbenzene, vinylnaphthalene and indene, as well as polyfunctional aromatic unsaturated hydrocarbon, such as divinylbenzene, divinyltoluene, divinylxylene and trivinylbenzene;

(5) Aliphatic or alicyclic unsaturated hydrocarbon: (5-1) olefin-based monomer (monoene), such as alkene [ethylene, propylene, butene-1, isobutylene, 3-methylbutene-1, pentene-1, heptene-1,4-methylpentene-1, diisobutylene, octene, dodecene, octadecene, 1-olefin(C20 to C36) etc.], and cycloalkene [cyclohexyene etc.]; (5-2) alkadiene, such as C4 to C12 chain structure alkadiene (butadiene, isoprene, neoprene, 1,3- and 1,4-pentadiene, 1,6-hexadiene, 1,3- and 1,7-octadiene, 1,3-dodecadiene etc.), and C5 to C12 cyclic alkadiene (cyclopentadiene, dicyclopentadiene, vinylcyclohexene, ethylidenebicycloheptene etc.); and (5-3) terpene [pyrene, limonene etc.];

(6) Epoxy group (glycidyl group etc.)-containing monomer, such as glycidyl (meth)acrylate, tetrahydrofurfuryl (meth)acrylate, p-vinylphenylphenyloxide, 3,4-dihydro-1,2-pyran and (meth)allyl glycidyl ether;

(7) Nitrile group-containing monomer, such as AN, methacrylonitrile, cyanoST and cyanoalkyl(C2 to C4) (meth)acrylate [cyanoethyl (meth)acrylate etc.];

(8) Hydroxyl group and/or ether bond-containing monomer other than the aforementioned (1-2);

(8-1) Unsaturated mono- and polyol: C2 to C24 unsaturated monohydric alcohol, such as alkenol [vinyl alcohol, (meth)allyl alcohol, (iso)propenyl alcohol, crotonyl alcohol etc.], aromatic unsaturated alcohol [cinnamyl alcohol, p-hydroxylstyrene etc.] and alkynol [propargyl alcohol etc.]; and unsaturated (poly)ether mono- and polyol, such as alkenyl or alkenylaryl (C2 to C24) ether of low-molecular polyol of the aforementioned (a22) or its AO adduct [vinyl ether, (meth)allyl ether, (iso)propenyl ether, crotonyl ether, cinnamyl ether, vinyl phenyl ether etc.], AO(C2 to C4) adduct of the aforementioned unsaturated monohydric alcohol];

(8-2) Unsaturated ether, such as hydrocarbyl(C1 to C20) ether of unsaturated mono- and polyol [aforementioned (8-1)], such as methoxyPEG(meth)allyl ether;

(9) Vinylester-based monomer:
Esters with unsaturated alcohol [aforementioned (8)] and carboxylic acid [C1 to C30 monocarboxylic acid described in aforementioned (1-2)], such as vinyl ester (vinyl formate, vinyl acetate, vinyl propionate, vinyl butyrate, vinyl benzoate, vinylmethoxy acetate etc.), isopropenyl acetate, (meth)allyl acetate, (meth)allyl benzoate, (meth)allyloxyethyl acetate and acetoxystyrene; monoester of the aforementioned unsaturated alcohol and polycarboxylic acid [aforementioned (h4)]; polyfunctional vinyl ester, such as monoester of the aforementioned unsaturated alcohol and polycarboxylic acid [aforementioned (h4)]; polyfunctional vinyl ester, such as polyester(diester etc.) of the aforementioned unsaturated alcohol and the aforementioned polycarboxylic acid, and ester of the aforementioned unsaturated alcohol and the aforementioned (2) unsaturated mono- or dicarboxylic acid [(meth)acrylate etc.];

(10) Halogen-containing vinyl-based monomer, such as halogenated unsaturated hydrocarbon [vinyl chloride, vinyl fluoride, vinylidene chloride, vinylidene fluoride, (meth)allyl chloride, mono- and di-chloroST chloroprene, fluorinated olefin described in U.S. Pat. No. 5238767], and halogen-substituted alkyl (meth)acrylate [fluorinated alkyl (meth)acrylate described in U.S. Pat. No. 5,238,767];

(11) Cationic group (amino group or quaternary ammonium salt group)-containing unsaturated monomer other than the aforementioned ones: amino group (primary, secondary or tertiary)-containing unsaturated hydrocarbon, such as alkenylamine [mono- and di-(meth)allylamine, crotylamine etc.] and amino group-containing styrene-based monomer [aminoST, N,N-dimethylaminoST, vinylbenzylamine etc.], and heterocyclic amino group-containing unsaturated monomer [4-vinylpyridine, 2-vinylpyridine, 2-methyl-5-vinylpyridine, vinylimidazole, N-vinylpyrrole, N-vinylcarbazole etc.]; products obtained by neutralizing or quaternarizing them [the same products as those of aforementioned (1-3)]], such as vinylbenzyltrimethylammonium salt;

(12) Unsaturated ketone, such as vinyl methyl ketone, vinyl ethyl ketone, vinyl phenyl ketone, and polyfunctional unsaturated ketone (divinyl ketone etc.);

(13) Sulfur-containing unsaturated monomer, such as p-vinyldiphenyl sulfide, vinylethyl sulfide, vinylethylsulfone, and polyfunctional sulfur-containing unsaturated monomer (divinylsulfone, divinyl sulfoxide, divinyl sulfide etc.); and

(14) Isocyanate group unsaturated monomer, such as isocyanatoethyl (meth)acrylate and m-isopropenyl-α,α-dimethylmethylbenzyl isocyanate.

Besides, monomers having at least one olefinic unsaturated group described in U.S. Pat. Nos. 4,130,523 and 3,424,706 can be also used.

Examples of the resin (V) include an acrylic-based resin (M), a styrene-based resin, a vinyl acetate-based resin, an olefin-based resin, an acrylonitrile-based resin, a halogen-containing vinyl-based resin, and a mixture of two or more of them.

Examples of the resin (M) include a (co)polymer of at least one (meth)acrylic acid ester (1) and a copolymer of at least one (4) and at least one other monomer. Among (1), preferable is (1-1), and particularly preferable is alkyl (meth) acrylate. Further preferable are methyl methacrylate, 2-ethylhexyl methacrylate and butyl acrylate (hereinafter, abbreviated as MMA, EHMA and BA, respectively), particularly, joint use of them. Other monomer is selected from the group consisting of (2) to (14) and, among them, preferable are (4) (particularly, ST), (6) (particularly AN) and joint use of them. A content of (1) among (M) is usually 20 to 100%, preferably 50 to 99% based on a weight of total monomers (hereinafter, the same).

Examples of a styrene-based resin include a (co)polymer of at least one styrene-based monomer (4) and a copolymer of at least one (4) and at least one other monomer. Among (4), preferable is ST. Other monomer is selected from the group consisting of (1) to (3) and (5) to (14) and, among them, preferable are (1) [further preferably (1-1), particularly preferably alkyl (meth)acrylate], (5) [further preferably (5-2), particularly preferably butadiene and cyclopentadiene], (6) (particularly, AN), and joint use of them. A content of (4) in a styrene-based resin is usually 20 to 100%, preferably 50 to 99%. A content of (1) is usually smaller than 20%.

Specific examples of a styrene-based resin include polyST, an ST/α-methylST copolymer, and an ST/alkadiene-based resin (D). Examples of the resin (D) include a (co)polymer of ST and at least one (5-2) and a copolymer of ST and at least one (5-2) and at least one other monomer. Other monomer is selected from the group consisting of (1) to (3), (5-1), (5-3) and (6) to (14) and, among them, preferable is (1) [further preferably (1-1), particularly preferably alkyl (meth)acrylate], and particularly preferable is (6) (particularly AN). Specific examples of (D) include a butadiene/ST copolymer, an AN/butadiene/ST copolymer (ABS resin), and a cyclopentadiene/ST copolymer. A ratio of ST/(5-2) in ST/(D) is usually 20/80 to 80/20, preferably 30/70 to 70/30. A content of other monomer is usually 40% or smaller, preferably 30% or smaller, and a content of (1) is smaller than 20%.

Examples of a vinyl acetate-based resin include a polymer of vinyl acetate and a copolymer of vinyl acetate (usually 20 to 100%, preferably 50 to 99%) and at least one other monomer [preferably (5) (particularly, ethylene), (8) (particularly, vinyl alcohol), other (9) (particularly, other vinyl ester) and joint use of two or more of them] [contents of (1) and (4) are smaller than 20%]. Specific examples include an ethylene/vinyl acetate copolymer and its partial hydrolysate.

Examples of an olefin-based resin include a (co)polymer of at least one olefinic-based monomer (5-1) (polyethylene, polypropylene, polybutene-1, polyisobutylene, poly-3-methylbutene-1, poly-4-methylpentene-1, polyethylene/propylene copolymer, propylene/isobutylene copolymer, C8 to C18 olefin copolymer etc.), and a copolymer of at least one (5-1) (usually 20 to 100%, preferably 50 to 99%) and at least one other monomer [contents of (1), (4) and vinyl acetate are smaller than 20%].

Examples of an acrylonitrile-based resin include polyAN, and a copolymer of AN (usually 20 to 100%, preferably 50 to 99%) and at least one other monomer (MMA, methyl acrylate, vinyl acetate, vinyl chloride, vinylidene chloride, N-methyl or ethylacrylamide, 2-methyl-5-vinylpyridine etc.) [contents of (1), (4), (5-1) and vinyl acetate are smaller than 20%].

Examples of a halogen-containing vinyl-based resin include a (co)polymer of at least one halogen-containing vinyl-based monomer (10) (polyvinyl chloride, polyvinylidene chloride etc.), and a copolymer of at least one (10) (usually 20 to 100%, preferably 50 to 99%) and at least one other monomer [contents of (1), (4), (5-1), vinyl acetate and AN are smaller than 20%](e.g. vinylidene chloride copolymer described in U.S. Pat. No. 3,424,706).

A ratio of a hydrophilic monomer [a monomer having a hydrophilic group (anionic group, cationic group, oxyethylene group, hydroxyl group etc.) among the aforementioned (1) to (14) and/or reactive emulsifier described later] in the resin (V) is preferably 10% or smaller, particularly preferably 0.1 to 8%. A ratio of a polyfunctional monomer is preferably 5% or smaller, particularly preferably 1% or smaller.

Resin (V) has Mn of usually 2,000 to 2,000,000 or larger, preferably 10,000 to 1,500,000.

A process for preparing (V) and its aqueous dispersion are not particularly limited, but includes a process for preparing directly an aqueous dispersion of (V) by emulsification polymerization or suspension polymerization, and a process for preparing melt-like or solution-like (V) by bulk polymerization or solution polymerization. Preferable are emulsification polymerization and suspension polymerization methods. An aqueous dispersion of (V) obtained as melt-like or solution-like state can be prepared by emulsifier emulsification as in the aforementioned (U).

Upon polymerization, the known polymerization initiator, emulsifier, chain transfer agent and organic solvent may be used.

Examples of a polymerization initiator include a radical polymerization initiator, such as an azo compound (AIBN, AVN, azobisisovaleric acid etc.); peroxide such as organic peroxide (benzoyl peroxide, dicumyl peroxide, t-butyl hydroperoxide, lauroyl peroxide, cumenehydroperoxide etc.) and inorganic peroxide [persulfate (potassium persulfate, sodium persulfate, ammonium persulfate etc.), perborate, persuccinic acid etc.], as well as joint use of two or more of them. An amount of a polymerization initiator to be used is usually 0.1 to 5% relative to a total amount of monomers. Examples of an emulsifier used in emulsification polymerization include surfactants exemplified as the aforementioned emulsifier, and reactive emulsifiers copolymerizable in an emulsification polymerization step. Examples of the reactive emulsifier include anionic (meth)acrylic acid ester [sulfate ester salt of mono(meth)acrylate of (poly) oxyalkylene(C2 to C4)ether (EO 1 to 30 mole adduct) of bisphenols or bisphenols substituted with hydrocarbyl(C1 to C24)(bisphenol A, styrenated and/or benzylated bisphenol A), sulfate ester salt of mono(meth)acrylate of (poly)oxyalkylene (C2 to C4)ether (EO 1 to 30 mole adduct) of polycyclic polyhydric phenol such as formaldehyde-condensate of styrenated and/or benzylated phenol, as well as polyoxyalkylene(C2 to C4, p=2 to 200)mono(meth)acrylate sulfate ester salt etc.], anionic (meth)acrylamide [(meth) acrylamidealkane(C1 to C24)sulfonate salt etc.], anionic (meth)allylester [alkyl(C8 to C24)(meth)allylsulfosuccinic acid ester salt etc.](these salts include alkali metal salt, ammonium salt, amine salt, quaternary ammonium salt, etc.), and reactive emulsifiers described in European Patent EP0718379B1, and International Application PCT/JP01/09863. An amount of an emulsifier to be used is usually 0.1 to 8%, preferably 0.5 to 5% relative to a total amount of monomers.

Examples of a chain transfer agent include mercaptans such as alkylmercaptan (butylmercaptan, dodecylmercaptan etc.); α-methylstyrene dimer; halogenated hydrocarbon such as chloroform, carbon tetrachloride and carbon tetrabromide; enol ethers such as those described in JP-A No.55-31880; as well as a mixture of two or more of them. An amount of a chain transfer agent to be used is usually 5% or smaller, preferably 0.1 to 3% relative to a total amount of monomers.

Examples of an organic solvent include organic solvents exemplified for the aforementioned (a214). Preferable are ketones (particularly, MIBK) and aromatic hydrocarbons. An organic solvent may be removed by distillation after polymerization, etc.

A weight average particle diameter of an aqueous dispersion of (V) obtained in these methods is usually 0.005 to 4 µm, preferably 0.01 to 4 µm, particularly preferably 0.01 to 3 µm. Dispersions (I) and (II) when a part of the resin (A) is (V) can be prepared by II-1) a method of preparing an aqueous dispersion of a vinyl-based resin (V1) in advance as described above, according to the aforementioned (II), and then introducing and dispersing a melt or solution-like other resin (A2)[a resin other than an addition polymerization system resin, such as (U) and/or (E)] in an aqueous dispersion of (V1) using an emulsifying machine, in the state where the aqueous dispersion is flown or stirred; or conversely, (II-2) a method of preparing an aqueous dispersion of other resin (A1) in advance as described above, and introducing and dispersing a melt or solution-like vinyl-based resin (V2) in an aqueous dispersion of (A1) using an emulsifying machine, in the state where the aqueous dispersion is flown or stirred.

In this case, aqueous dispersions (I) and (II) in which (V1) and (A2) or (V2) and (A2) have different particle diameters can be formed as in the case of the aforementioned (U). For example, in order that (A2) has a larger particle diameter by the method of II-1), there are 1) a method of weakening hydrophilicity of (A2), 2) a method of decreasing an amount of an emulsifier to be added, 3) a method of reducing a shear force at emulsification of (A2), and a combination of two or more of them. A preferable amount of an emulsifier in the case of 2) is as described for the case of the aforementioned (U).

In the aforementioned case, a dispersion of (V) constituting a part of (A) may comprise one kind of (V), or may comprise (V)s having two or more different particle diameters. The latter dispersion can be prepared as in the case of the aforementioned (U).

Properties of Resins Constituting (P1) and (P2)

A difference in HLBs of resins constituting (P1) and (P2) in a particle diameter distribution curve of aqueous dispersions (I) and (II) of the present invention is 0.1 to 10, preferably 2 to 8, further preferably 3 to 7. When a difference in HLBs is 0.1 or larger, since upon preparation of an aqueous dispersion of resins constituting (P2), resins can be dispersed using a small amount of a surfactant, water resistance of a coated film after drying tends to be improved, and adherability with a substrate tends to be improved. If a difference in HLBs is 0.1 or larger, even when a surfactant is not used, it is not necessary to change a mechanical shear force greatly and, thus, a desired aqueous dispersion can be obtained. On the other hand, if a difference in HLBs is 10 or smaller, hydrophilicity of a resin having larger HLB does not becomes too great, and it does not approach water-soluble, therefore, a stable aqueous dispersion is easily obtained. Herein, HLB is HLB of an Oda method, and is calculated by the following equation from organic property and inorganic property values of an organic compound [Ryohei Oda, Teijin Times, 22, No.9 (1952)].

$$HLB = 10 \times \text{inorganic property/organic property}$$

In the present invention, a peaktop particle diameter of (P1) in a particle diameter distribution curve measured by a photon correlation method is preferably 0.1 to 4 µm, further preferably 0.1 to 3.5 µm, particularly preferably 0.2 to 3 µm, especially preferably 0.3 to 2 µm.

In addition, a peaktop particle diameter of (P1) in a particle diameter distribution curve measured by an ultrasound measuring method is preferably 0.1 to 4 µm, further preferably 0.3 to 3 µm, particularly preferably 0.4 to 2 µm.

When a peaktop particle diameter of (P1) is 4 µm or smaller, a particle settles with difficulty over days, and storage stability is improved.

A ratio of a peaktop particle diameter of (P1) and a peaktop particle diameter of (P2) is preferably 2/1 to 100/1, further preferably 2.2/1 to 20/1, particularly preferably 2.5/1 to 15/1 in a photon correlation method and in an ultrasonic measuring method. If this ratio is at least 2/1, there is a tendency that a low viscosity is retained even at a high concentration and, if this ratio is in a range not exceeding 100/1, there is a tendency that storage stability is improved.

In addition, a peaktop particle diameter of (P2) is preferably 0.01 to 1 µm, further preferably 0.01 to 0.3 µm, particularly preferably 0.03 to 0.2 µm, especially preferably 0.05 to 0.2 µm in a photon correlation method and in an ultrasonic measuring method.

If a peaktop particle diameter of (P2) is 0.01 µm or larger, there is a tendency that a viscosity is lowered, and flowability is further better.

Figure 2:
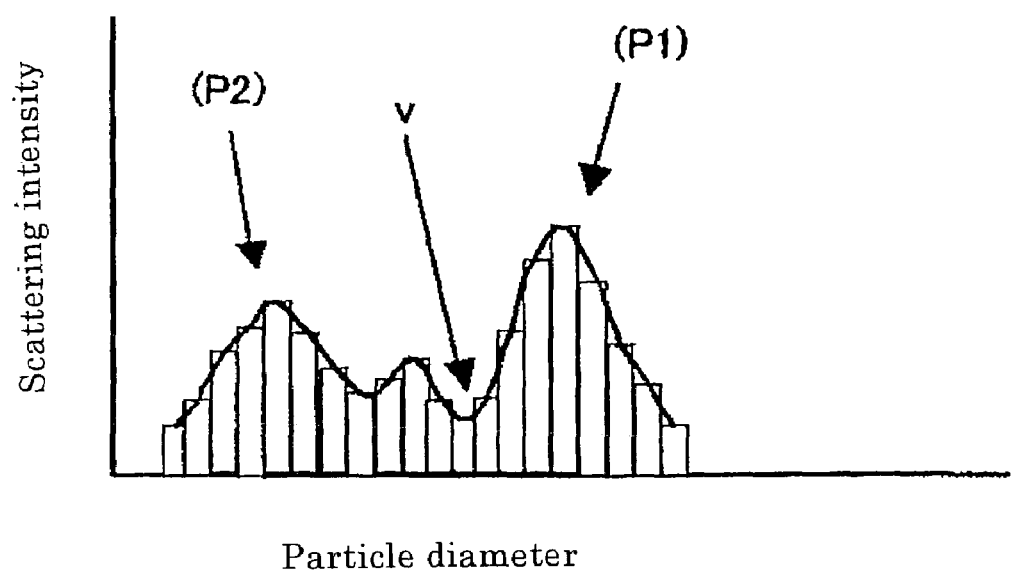

In addition, in both of a photon correlation method and an ultrasonic measuring method, there is at least one valley between (P1) and (P2) in a particle diameter distribution curve and, among valleys, a height of a lowest valley (e.g. height of point v in FIG. 1, and point v in FIG. 2) is preferably 80% or smaller, further preferably 50% or smaller, particularly preferably 30% or smaller of a height of (P2). If a height of this valley is 80% or smaller of a height of (P2), an aqueous dispersion having a sufficiently low viscosity is obtained.

In addition, it is preferable that at least one of resins forming (P1) and (P2) has a hydrophilic group (Q) having the number of groups inherent to an atomic group of 0.3 or larger (further preferably 1.5 or larger, particularly preferably 2 or larger) by a Davis method. Examples of a hydrophilic group Q include an ionic group (anionic group, cationic group etc.) and a nonionic group exemplified for the aforementioned self-emulsifying (U). Preferable is an anionic group, and particularly preferable are an alkyl metal salt (sodium salt etc.) of a carboxyl group and an alkali metal salt (sodium salt etc.) of a sulfonic acid group.

When a resin is a resin having Q having the number of groups of 0.3 or larger, particularly, upon preparation of an aqueous dispersion of a resin forming (P2), since the resin can be dispersed using a small amount of a surfactant, there is a tendency that water resistance of a coated film after drying is improved, and adherability with a substrate is improved. In addition, even when a surfactant is not used, it is not necessary to change a mechanical shear force greatly and, thus, a desired aqueous dispersion can be obtained.

It is preferably that a content of Q in a resin in resins forming (P1) and resins forming (P2) is preferably 0.02 to 30%, particularly preferably 0.05 to 15% based on a weight of resins, and a difference in contents of Q in resins forming (P1) and (P2) is 0.1% or larger. When Q is an ionic group, a difference in contents of Q is further preferably 0.03 to 10%, particularly preferably 0.5 to 3%. When Q is a nonionic group, a difference in contents of Q is further preferably 0.5 to 20%, particularly preferably 1 to 10%. A content of Q can be obtained by calculating a total of Q charged in a step of preparing a resin, relative to a finished resin.

A ratio of resins constituting (P1) and (P2) is usually 10/90 to 95/5, preferably 50/50 to 90/10. A total of resins constituting (P1) and (P2) is preferably 30 to 100%, particularly preferably 50 to 100% based on a total weight of all resins.

Examples of a dispersing medium used in an aqueous dispersion usually include water, and a hydrophilic organic solvent. Examples of a hydrophilic organic solvent include a hydrophilic organic solvent having solubility in water of 30 g or more/100 g water among organic solvents exemplified in the aforementioned (a214), for example, monohydric alcohol (methanol, ethanol, i-propanol etc.), glycols (EG, PG, diethylene glycol etc.), tri- or more-hydric alcohols (GL etc.), and cellosolves (methyl and ethylcellosolve, etc.). Among dispersing media, preferable is an aqueous medium, particularly water. When a hydrophilic organic solvent is used jointly, usually, it is preferable that a hydrophilic organic solvent is 10% or smaller based on a total of dispersing media.

The aqueous dispersion of the present invention can be used in utilities such as paints, coating agents, adhesives, pressure -sensitive adhesives and fiber and textile processing agents explained below.

Paints and Coating Agents

The aqueous dispersion of the present invention can be used as a binder component in paints (coating agents), and is usually applied to aqueous paints.

Preferable in this utility are (U), (E), (M) and (D).

Paints may contain a crosslinking agent in order to improve coated film performance. A crosslinking agent includes the following (x1) to (x4):

(x1) Water-soluble or water-dispersible amino resin, such as a melamine resin and a urea resin containing an (alkoxy) methylol group and/or an imino group [preferably melamine resin containing methylol group and/or imino group];

(x2) Water-soluble or water-dispersible polyepoxide, such as bisphenol A type gylcidyl ether, hydrogenated bisphenol A type glycidyl ether, glycidyl ether of polyol [aforementioned (a221)(EG, GL, TMB, sorbitol etc.), and AO(C2 to C3) adduct thereof (PEG etc.)], and polyepoxide to which an emulsifying agent (aforementioned surfactant etc.) is added to impart water dispersibility [preferable is glycidyl ether of polyhydric alcohol, particularly preferably sorbitol poly(di- to hexa)glycidyl ether and GL poly(di- and tri)glycidyl ether];

(x3) Water-soluble or water-dispersible polyisocyanate compound, such as polyisocyanate having a hydrophilic group (such as polyoxyethylene chain) in a molecule ["Coronate 3062" and "Coronate 3725" (manufactured by Nippon Polyurethane Industry Co., Ltd.)etc.], and blocked polyisocyanate [aforementioned (a1)(isocyanurate-modified IPDI etc.) blocked with a blocking agent (phenols, active methylene compound, lactam, oxime, bisulfite, tertiary alcohol, aromatic secondary amine, imide and mercaptan described in U.S. Pat. No. 4,524,104; (e.g. phenol, MEK, ε-caprolactone etc.)];

(x4) Others, polyethyleneurea (diphenylmethane-bis-4,4'-N,N'-ethyleneurea etc.).

An amount of a crosslinking agent to be added is usually 0 to 30%, preferably 0.1 to 20% based on a solid matter weight of an aqueous dispersion.

If necessary, one or more other additives such as a pigment, a pigment dispersant, a viscosity adjusting agent, an anti-foaming agent, a leveling agent, an antiseptic, a degradation-preventing agent, a stabilizer and an anti-freezing agent may be added to paints.

Examples of a pigment include inorganic pigments such as white pigments (titanium white, zinc white, lithopone, white lead etc.), transparent white pigments (calcium carbonate, barium sulfate, calcium silicate etc.), black pigments (carbon black, animal black, red lead etc.), grey pigments (zinc powder, slate powder etc.), red pigments (rouge, red lead etc.), brown pigments (amber, iron oxide powder, Vandyke brown etc.), yellow pigments (chrome yellow, zinc chromate, yellow iron oxide etc.), green pigments (chromium green, chromium oxide, viridian etc.), blue pigments (ultramarine, Prussian blue etc.), purple pigments (mars purple, pale cobalt purple etc.) and metallic pigments (aluminum flake, copper bronze flake, mica iron oxide, mica flake etc.); as well as organic pigments such as natural organic pigments (Cotinil lake, Mada lake etc.), and synthetic organic pigments such as nitroso pigments (Naphthol Green Y, Naphthol Green B etc.), nitro pigments (Naphthol Yellow S, Pigment Chlorin, Litol Fast Yellow GG etc.), pigment dye type azo pigments (Toluidine Red, Hansa yellow, Naphthol AS-G etc.), azo lake made from water-soluble dyes (Persia Orange, Ponso 2R, Buildo B etc.), azo lake made from hardly soluble dyes (Risol Red, Born Malune, Red Lake etc.), lake made from basic dyes (Fanal Color etc.), lake made from acidic dyes (Acid Green Lake, Peacock Blue Lake etc.), xanthan lake (eosin etc.), anthraquinone lake (alizarin lake, purpurine lake etc.), pigments from vat dyes (indigo, argon yellow etc.), and phthalocyanine pigments (phthalocyanine blue, phthalocyanine green etc.).

Examples of a pigment dispersant include various surfactants [anionic, cationic, nonionic, amphoteric, polymer (Mn=1,000 to 20,000)] exemplified as an emulsifier in the aforementioned emulsifier-emulsified type aqueous resin dispersion.

Examples of a viscosity adjusting agent include a thickener, such as an inorganic viscosity adjusting agent (sodium silicate and bentonite), a cellulose viscosity agent (methylcellulose, carboxymethylcellulose, hydroxymethylcellulose etc., Mw is usually 20,000 or larger), a proteinaceous agent (casein, sodium caseinate, ammonium caseinate etc.), acrylic agent (sodium polyacrylate, ammonium polyacrylate etc., Mw is usually 20,000 or larger), and vinyl agent (polyvinyl alcohol etc., Mw is usually 20,000 or larger). Acrylic and vinyl viscosity adjusting agents are preferable.

Examples of an anti-foaming agent include long chain alcohols (octyl alcohol etc.), sorbitan derivatives (sorbitan monoolate etc.), and silicone oils (polymethylsiloxane, polyether-modified silicone, fluorine-modified silicone etc.); examples of an antiseptic include organic nitrogen sulfur compounds and organic sulfur halogen compound antiseptics; examples of a degradation-preventing agent and a stabilizer (ultraviolet absorbing agent, antioxidant etc.)

include hindered phenol series, hindered amine series, hydrazine series, phosphorus series, benzophenone series, and benzotriazole series; examples of an anti-freezing agent include EG and PG.

An amount of these components to be incorporated is different depending on utilities, and generally, in the case of pigment paint, an amount of an aqueous resin dispersion is 10 to 300 parts (solid matters), an amount of a viscosity adjusting agent is 0 to 5 parts, an amount of an anti-foaming agent is 0 to 5 parts, an amount of an antiseptic agent is 0 to 5 parts, an amount of a degradation-preventing agent or a stabilizer is 0 to 5 parts, and an amount of an anti-freezing agent is 0 to 5 parts relative to 100 parts of a pigment. In addition, in a clear paint, usually, an amount of an anti-foaming agent is 0 to 3 parts, an amount of an antiseptic agent is 0 to 3 parts, an amount of an ultraviolet-ray preventing agent is 0 to 3 parts, and an amount of an anti-freezing agent is 0 to 8 parts relative to 100 parts of an aqueous resin dispersion (solid matters).

A pigment aqueous paint can be prepared by mixing a pigment dispersant into the aqueous resin dispersion of the present invention, adding a pigment thereto to disperse it and, if necessary, adding other additive, and filtering undispersed materials. A dispersing machine (attrizer, bead mill, three-roll, ball mill etc.) can be used for dispersing the aforementioned materials.

A paint comprising the aqueous dispersion of the present invention can be coated by the conventional coating means (spray coating, brush coating, roll coating etc.). A viscosity of a paint is appropriately selected depending on a coating method. For example, in the case of spray coating, preferably, a viscosity at a shear rate of 1000 s$^{-1}$ is 20 to 50 mPa·s and a viscosity at a shear rate of 10 s$^{-1}$ is 180 to 280 mPa·s. When a viscosity at a shear rate of 1000 s$^{-1}$ is 50 mPa·s or smaller, a paint is easily ejected from spraying. When a viscosity at a shear rate of 10 s$^{-1}$ is 180 mPa·s or larger, sagging hardly occurs. These viscosities are measured with a high-shear-viscometer ("HSV-2" manufactured by Nippon Seiki Co., Ltd.).

A paint comprising the aqueous dispersion of the present invention can be coated on a subject to be coated directly or via a primer, monolayer coating or multilayer (2 to 8 layers) recoating is possible, and the paint can be used in any of undercoating, intercoating and topcoating. Examples of a subject to be coated include timbers, papers, leathers, metals (aluminum, iron, copper, various alloys etc.), plastics (vinyl chloride-based resin, acrylic-based resin, styrene-based resin etc.), and inorganic materials (concrete, slate, calcium silicate plate etc.). Examples of a form of a subject to be coated include films, fibers, nonwoven fabrics, sheets, plates, bars, pipes, blocks, various molded articles, and structures.

A paint comprising the aqueous dispersion of the present invention is useful in various paints and coating agents (topcoating, intercoating and undercoating paints for automobiles, construction paints, rust-preventing coating for metals, flaw-preventing coating for metals and resins, water resistant coating for papers and leathers, solvent resistant coating and moistureproof coating, as well as polishing coating floors), and various binders (automobile coating binders, outer wall coating binders, coated paper binders, and ceramic binders). An amount of a paint to be coated is different depending on utility and purpose, and an amount as an aqueous paint itself (wet-state) is usually 0.5 to 1,000 g/m$^2$, preferably 1 to 300 g/m$^2$.

Drying condition after coating is from a normal temperature to around 200° C. A drying format is not particularly limited, but for example, hot air, infrared-ray, and electric heater are used.

Adhesive

The aqueous dispersion of the present invention is used as a main agent in an adhesive.

Preferable in this utility are (U), (E), (M) and an epoxy resin.

In order to further manifest adhering function, a crosslinking agent can be added to an adhesive, if necessary, other additives such as a pigment, a pigment dispersant, a viscosity adjusting agent, a stabilizer, an antiseptic and an anti-freezing agent can be added to an adhesive. These crosslinking agent and additive include the same agents as those exemplified for the aforementioned paint.

A solid matter ratio of the aqueous dispersion and the crosslinking agent is 50 to 99:1 to 50, preferably 70 to 97:3 to 30. When a ratio of a crosslinking agent is 1 or larger, a sufficient adhering strength and durability are obtained and, when the ratio is 50 or smaller, an adhered article scarcely becomes fragile, being preferable. A method of mixing the aqueous dispersion and the crosslinking agent is not particularly limited, but examples include mixing by conventional stirring and methods using a mixing apparatus (paint conditioner, ball mill, kneader, sand grinder, flat stone mill etc.).

Examples of means for applying an adhesive to an adherend include brush coating, roll coating, spray coating, curtain flow coating and dipping. Adhesion can be performed by applying an adhesive to a adherend, and laminating this as it is (without drying) with other adherend (wet adhesion), or after drying, laminating with other adherend (dry adhesion), and curing an adhesive layer. Alternatively, adhesion may be performed by curing by intervening a dried film of an adhesive between adherends. Curing can be performed by aging at a normal temperature or under heating (e.g. around 60 to 80° C.), or by, after aging at a normal temperature, heating to around 60 to 80° C. to promote curing.

An adherend is not particularly limited, but an adhesive can be widely used in substrates such as timbers, resin films, rubbers, leathers, papers and metals.

An adhesive comprising the aqueous dispersion of the present invention is useful in, for example, woodworking adhesives, metal parts adhesives, plastic adhesives, electronic substrate adhesives and cloth adhesives.

Fiber and Textile Processing and Treating Agent

The aqueous dispersion of the present invention can be widely used in fiber and textile processing binders (pigment printing binders, nonwoven fabric binders, reinforcing fiber sizing agents, antibacterial binders etc.) or coatings (waterproofing coating, water repellant coating, anti-stain coating etc.), and artificial leather-synthetic leather row materials.

Preferable for pigment printing binders are (U), (E) and (M); preferable for nonwoven binders are (U), (E) and (M); preferable for reinforcing fiber sizing agents are (U), (E), (M) and an epoxy resin: preferable for antibacterial binders are (U), (E) and (M); preferable for coatings are (U), (E) and (M); preferable for artificial leather -synthetic leather raw materials is (U).

When used as a pigment printing binder, if necessary, one or more of an emulsifier, a stabilizer (ultraviolet absorbing agent, antioxidant etc.), a thickener, a film forming aid and other aid may be added to the aqueous dispersion. Examples of an emulsifier include the same emulsifiers as those described above. In particular, an anionic surfactant and a nonionic surfactant are preferable. Examples of a stabilizer and a thickener include the same stabilizers and thickeners as those exemplified in the aforementioned paints. Examples of a film forming aid include N-methyl-2-pyrrolidone; examples of other aid include printing suitability imparting agent and gum up preventing agent.

Pigment printing can be performed by printing onto fabrics as in conventional pigment printing. Specifically, for example, a color paste (in which a pigment is finely and uniformly dispersed in water), the aqueous dispersion of the present invention, a thickener, and other aids are incorporated to prepare a printing paste, and this is printed on fabrics. A paddle-mixing tank etc. is used for incorporation. An autoscreen printer, a rotary screen printer, and a roller printer can be used in printing. Natural fibers (cotton, flax, wool silk etc.), semi-synthetic fibers (rayon, acetate etc.), and synthetic fibers (polyester, polyamide, polyAN, polyolefin etc.) can be used in fabrics.

Examples of a reinforcing fiber to be applied when used as reinforcing fiber sizing agents include inorganic fibers (glass fiber, carbon fiber etc.) and high strength organic fibers (polyamide fiber, polyester fiber etc.) described in British Patent No.1543099.

When used as glass fiber sizing agents, if necessary, one or more additives such as a silane coupling agent (y-aminopropylethoxysilane, y-methacryloxypropyltrimethoxysilane, vinyltrichlorosilane, vinyltriethoxysilane, y-glycidoxypropyltrimethoxysilane etc.), a lubricant (fatty acid amide, soap etc.), an antistatic agent (the aforementioned surfactant etc.), a plasticizer (phthalic acid ester, adipic acid ester etc.), and an anti-foaming agent (as described above) may be added to the aqueous dispersion of the present invention.

Sizing agents may be used with other sizing agents, and examples include starch, processed starch, dextrin, amylose, gelatin, carboxymethylcellulose, polyvinyl alcohol, polyvinylpyrrolidone, polyvinyl acetate, aqueous polyester resin, aqueous epoxy resin, and aqueous acrylic resin. The aqueous dispersion and an arbitrary additive are incorporated to prepare a treating solution, this is applied to fibers and, if necessary, heated and dried to fix this. A mixing tank (paddle type) etc. is used for incorporation. The concentration of a treating solution is usually 1 to 10%. Application to fibers is performed by roller coating, spray coating, immersion coating etc. An amount to be adhered to fibers is usually 0.1 to 10%. Drying and fixing can be performed, for example, at 50 to 100° C.

When used as antibacterial binders, coatings, or artificial leather synthetic leather raw materials, additives, the concentration of a treating solution, means for application to fibers, an amount to be adhered to fibers, and treating conditions etc. may be the same as those described above, and can be appropriately adopted depending on utilities.

BEST MODE FOR CARRYING OUT THE INVENTION

The following Examples illustrate the present invention more specifically, but the present invention is not limited by them.

In the following Examples, a dispersing machine I used is a rotator-stator emulsifying machine (manufactured by M Technique, Clear Mix LCM-0.8S), and a dispersing machine II is a rotator-stator dispersing machine [manufactured by Ebara Corporation, Ebara Milder MDN303V-D]. Unless otherwise indicated, a viscosity was measured at 25° C. and a rotation rate of 60 rpm using a rotary viscometer (manufactured by TOKIMEC(K.K.)). Stability with day was assessed as follows: 80ml of a dispersion (or aqueous paint) was taken in a glass settling tube having an inner diameter of 2.5 cm and a volume of 100 ml, and stored at 25° C. Appearance was checked once per day, and stability was assessed by days until a separation interface appeared. In the case where separation does not occur after passage of 90 days, this is described as >90.

PREPARATION EXAMPLES 1 TO 7

Preparation of Up

According to formulation (parts) described in Table 1, initial charging components were charged into an autoclave equipped with a thermometer, a stirrer and a nitrogen blowing tube, the atmosphere was replaced with nitrogen, and thereafter, urethanation was performed at 80° C. while stirring, then this was cooled to 40° C., additional acetone and TEA were added, and uniformly mixed to obtain a solution of Up (Up1 to Up7). A NCO content (%) of Up (solid matter) contained in those solutions is shown in Table 1. All of PMPA, PTMG and PHCD used had Mn of 2,000, and PCLD was PLACCEL L220AL manufactured by Daisel Chemical Industries Co., Ltd.

PREPARATION EXAMPLES 8 TO 14

Preparation of Dispersion of (U)

Using each Up described in Table 2, a dispersion of (U) was prepared by the following method I or method II.

Method I:

Using a dispersing machine I, Up and water were continuously supplied into a rotator-stator rotating at a rotation number of 7,000 to 9,000 rpm, at a rate of 45 parts/min and at a retention time of 2 minutes, to perform dispersing, and Up dispersed in water was stored in a receiving tank equipped with a stirrer. Then, in the receiving tank, Up dispersed in water was subjected to a chain extension reaction under the following 1's or 2's condition, until a NCO group was substantially consumed, and acetone was distilled off under reduced pressure. Thereafter, the same amount as that of water distilled off with acetone, of water, and the same amount as that of TEA distilled off with acetone, of TEA were added, respectively, to obtain a dispersion of (U)(U1 to U7).

Condition 1: Such an amount that an equivalent ratio of NCO/amino group was 1/1, of EDA was added, and a chain was extended while stirring at 30° C. for 30 minutes.

Condition 2: As such (without addition of EDA) was stirred at 50° C. for 12 hours, and a chain was extended with water.

Method II:

In advance, 125 Parts of water was charged into a four-neck flask equipped with a thermometer, a stirrer and a condensing tube, 230 parts of Up was placed under high speed stirring, and dispersing was performed. To the resulting dispersion was further added 4 parts of a solution in which 2 parts of EDA had been dissolved in 2 parts of water, the materials were stirred at 40° C. for 12 hours, to perform a chain extension reaction, acetone was distilled off under reduced pressure, the same amounts as those of water and TEA distilled off with acetone of water and TEA were added, respectively, to obtain a dispersion of (U).

TABLE 1

| | Preparation Example No. | | | | | | |
|---|---|---|---|---|---|---|---|
| | 1 | 2 | 3 | 4 | 5 | 6 | 7 |
| Initial charging components | | | | | | | |
| PMPA | 73 | 73 | — | — | — | — | — |
| PTMG | — | — | 73 | 73 | — | — | — |
| PHCD | — | — | — | — | 73 | 73 | — |
| PCLD | — | — | — | — | — | — | 99 |
| BD | 3 | 3 | 5 | 5 | — | — | — |
| DMPA | 5 | 2 | 5 | 2 | 5 | 2 | 2.8 |
| Acetone | 5 | 5 | 5 | 5 | 5 | 5 | 54 |
| IPDI | 34 | 33 | 33 | 33 | 25 | 25 | 24 |
| Additional acetone | 36 | 36 | 36 | 36 | 36 | 36 | 50 |
| TEA | 4 | 2 | 4 | 2 | 4 | 2 | 2 |
| Up symbol | Up1 | Up2 | Up3 | Up4 | Up5 | Up6 | Up7 |
| NCO content | 7.7 | 7.9 | 7.8 | 8.0 | 6.3 | 6.6 | 3.9 | and 0.4 part of diammonium hydrogen phosphate were charged into an autoclave equipped with a thermometer, a stirrer, a pressure gauge, a monomer solution introducing inlet, an initiator solution introducing inlet and a nitrogen blowing tube, the interior of a container was replaced with nitrogen, the aforementioned monomer dispersion was added dropwise at 75 to 85° C. over 6 hours while stirring, and then stirring was continued at the same temperature for 3 hours, thereafter 1 part of t-butylperoxy-2-ethyl hexanoate was added, and stirring was continued at the same temperature for 2 hours to obtain a dispersion (M1). A polymerizable emulsifier used was a sulfate ester salt of mono(meth)acrylate of polyoxyethylene ether of a styrenated phenol formaldehyde condensate [manufactured by Nippon Emulsifier (K.K.), Antox MS-60].

HLB and a hydrophilic group content (%) of resins constituting the dispersions obtained in Preparation Examples 8 to 16, as well as a concentration (%) and a viscosity (mPa·s) of the dispersions are shown in Table 2.

TABLE 2

| Preparation Example | Up | Method | Condition | Dispersion | HLB | Hydrophilic group content | Concentration | Viscosity |
|---|---|---|---|---|---|---|---|---|
| 8 | Up1 | I | 1 | U1 | 10.1 | 1.5 | 35 | 20 |
| 9 | Up2 | I | 2 | U2 | 9.7 | 0.8 | 35 | 15 |
| 10 | Up3 | I | 1 | U3 | 11.4 | 1.6 | 35 | 15 |
| 11 | Up4 | I | 2 | U4 | 10.0 | 0.7 | 35 | 20 |
| 12 | Up5 | I | 1 | U5 | 11.1 | 1.5 | 35 | 16 |
| 13 | Up6 | I | 2 | U6 | 9.8 | 0.8 | 35 | 18 |
| 14 | Up7 | II | — | U7 | 9.6 | 0.8 | 35 | 13 |
| 15 | — | — | — | E1 | 7.1 | 3.8 | 45 | 30 |
| 16 | — | — | — | M1 | 9.0 | 8.4 | 45 | 85 |

PREPARATION EXAMPLE 15

Preparation of Dispersion of (E)

4 Parts of toluene, 2 parts of MIBK, 11 parts of BEPD, 8 parts of HD, 1 part of PE, 14 parts of sebacic acid and 14 parts of isophthalic acid were charged into a four-neck flask equipped with a thermometer, a stirrer, a water separating tube, and a gas blowing tube, the materials were dehydrated at 180° C. under stirring while introducing a nitrogen gas, and esterification was performed until an acid value became 11.4. Then, the resulting solution of (E) was introduced into a four-neck flask containing 1 part of TEA, 1 part of polyoxyethylene(p=40)laurylether and 80 parts of water while high speed stirring, and toluene and MIBK were distilled off under reduced pressure to obtain a dispersion (E1) of (E).

PREPARATION EXAMPLE 16

Preparation of Dispersion of (M)

15 Parts of MMA, 32 parts of EHMA, 30 parts of BA, 5 parts of AN, 10 parts of ST, 8 parts of a polymerizable emulsifier and 100 parts of water were mixed to prepare a monomer dispersion. Then, 35 parts of water, 8 parts of a polymerizable emulsifier, 5 parts of ammonium persulfate,

EXAMPLES 1 TO 5 AND COMPARATIVE EXAMPLE 1 TO 3

Two kinds of dispersions having a proportion of solid matters to be incorporated described in Table 3, were blended, stirred for 30 minutes, or one kind of the dispersion was concentrated by an evaporator at 60° C., whereby, dispersions having a solid matter concentration of 65% were obtained.

TABLE 3

| | | Examples | | | | | Comparative Examples | | |
|---|---|---|---|---|---|---|---|---|---|
| | | 1 | 2 | 3 | 4 | 5 | 1 | 2 | 3 |
| Dispersion | Symbol | U1 | U3 | U5 | U1 | U2 | U1 | U2 | U1 |
| | Part | 25 | 30 | 20 | 25 | 75 | 100 | 100 | 25 |
| Dispersion | Symbol | U2 | U4 | U6 | E1 | M1 | — | — | U7 |
| | Part | 75 | 70 | 80 | 75 | 25 | — | — | 75 |

EXAMPLES 6 TO 8

The dispersion and Up were continuously and simultaneously supplied into a dispersing machine II rotating at a rotation number of 9,000 rpm, for 2 minutes at a supplying rate in the following Table 4, and the materials were dispersed to obtain 1,860 parts of a dispersion. This dispersion was charged into a four-neck flask equipped with a thermometer, a stirrer, and a condensing tube, an amount described in the following Table 4 of a 10% aqueous EDA solution was added, the mixture was stirred at 30° C. for 1 hour to subject Up to an extension reaction, and acetone was distilled off under reduced pressure to obtain a dispersion having a solid matter concentration of 65%.

TABLE 4

| | Dispersion | | Up | | 10% aqueous EDA solution (parts) |
|---|---|---|---|---|---|
| | Symbol | Supply rate (parts/min) | Symbol | Supply rate (parts/min) | |
| Example 6 | U1 | 380 | Up2 | 550 | 100 |
| Example 7 | E1 | 380 | Up1 | 80 | 23 |
| Example 8 | M1 | 170 | Up2 | 550 | 100 |

EXAMPLE 9

A 10 φ×125 mm SPG membrane having a fine pore diameter of 0.05 μm (Shirasu porous glass membrane: manufactured by SPG Techno) was attached to a membrane dispersion module (Ise Chemical Industries Co., Ltd.), a flow rate was adjusted so that U2 passed through the interior of the SPG membrane at 20 parts/min, 40 parts of Up1 was supplied at a rate of 4.6 parts/min from the outside of the SPG membrane, utilizing a back pressure (0.8 MPa) from the outside of a cylinder, passed through porous pores of the SPG membrane, and contacted with U2 in the interior, to disperse Up1. Thereafter, the dispersion was stirred at 50° C. for 12 hours in a four-neck flask equipped with a thermometer, a stirrer, and a condensing tube, isocyanate at a molecular end was subjected to an extension reaction with water, and acetone was distilled off under reduced pressure to obtain a dispersion having a solid matter concentration of 65%.

EXAMPLE 10

Water and Up1 were continuously supplied for 10 minutes into a dispersing machine II rotating at a rotation number of 12,000 rpm, at a rate of 146 parts/min and 184 parts/min, respectively, to prepare a dispersion; subsequently, the aforementioned dispersion and Up2 were continuously supplied for 10 minutes into another dispersing machine II rotating at a rotation number of 9,000 rpm, at a rate of 330 parts/min and 550 parts/min, respectively. Then, 8,800 parts of the resulting dispersion was charged into a four-neck flask equipped with a thermometer, a stirrer and a condensing tube, 1,000 parts of a 10% aqueous EDA solution was added, the mixture was stirred at 30° C. for 1 hour to perform a chain extension reaction, and acetone was distilled off under reduced pressure to obtain a dispersion having a solid matter concentration of 65%.

COMPARATIVE EXAMPLE 4

Up1 and water were continuously and simultaneously supplied for 2 minutes into a dispersing machine II rotating at a rotation number of 9,000 rpm, at a rate of 550 parts/min and 500 parts/min, respectively, to disperse the material to obtain 1,050 parts of a dispersion (A) of Up1. 525 parts of A was further supplied for 1 minute into the same dispersing machine at a rotation number of 12,000 rpm, at a rate of 500 parts/min, to disperse the material to obtain a dispersion (B) in which Up1 was finely dispersed.

A and B were blended at a solid matter ratio of 75/25, in a four-neck flask equipped with a thermometer, stirrer and a condensing tube, 100 parts of a 10% aqueous EDA solution was added, the mixture was stirred at 30° C. for 1 hour to subject Up1 to an extension reaction, and then, acetone was distilled off under reduced pressure to obtain a dispersion having a solid matter concentration of 65%.

COMPARATIVE EXAMPLE 5

According to the same manner as that of Comparative Example 4 except that Up2 was used in place of Up1, a dispersion having a solid matter concentration of 65% was obtained.

A particle diameter distribution of these dispersions were measured by a photon correlation method (measuring method 1) or an ultrasonic method (measuring method 2), and an average particle diameter, a variation coefficient, a skewness and a kurtosis of each of (P1) and (P2), a ratio of peaktop particle diameters of (P1)/(P2) and a ratio of heights of peaktops, as well as a ratio of a height of valley/(P2) were calculated. Those results are shown in Table 5. In addition, regarding these dispersions, a coefficient A, a constant item B and a contribution rate of a relationship equation (1) between a concentration and a viscosity were obtained, a viscosity was measured, and stability with day was assessed. Those results are shown in Table 6.

In addition, regarding these dispersions, a coefficient A, a constant item B and a contribution rate of a relationship equation (1) between a concentration and a viscosity were obtained, a viscosity was measured, and stability with day was assessed. Those results are shown in Table 6.

TABLE 5

| | | Particle diameter distribution of (P1) | | | | Particle diameter distribution of (P2) | | | | | (P1)/(P2) | | |
|---|---|---|---|---|---|---|---|---|---|---|---|---|---|
| | Measuring method | Average particle diameter | Variation coefficient | Skewness | Kurtosis | Average particle diameter | Variation coefficient | Skewness | Kurtosis | Number of peaks | Particle diameter ratio | Height ratio | Valley height/(P2) |
| Examples | | | | | | | | | | | | | |
| 1 | 1 | 0.63 | 50 | 1.2 | 4.3 | 0.06 | 47 | 1.2 | 4.3 | 2 | 11/1 | 3.2/1 | 0/100 |
| 2 | 1 | 0.80 | 75 | 0.3 | 1.7 | 0.06 | 47 | 1.2 | 4.3 | 2 | 13/1 | 3.0/1 | 0/100 |
| 3 | 1 | 0.63 | 50 | 1.2 | 4.3 | 0.15 | 17 | 0.3 | 2.2 | 2 | 4/1 | 2.9/1 | 0/100 |
| 4 | 1 | 0.75 | 19 | 0.3 | 2.3 | 0.07 | 38 | 0.6 | 2.7 | 2 | 11/1 | 3.3/1 | 0/100 |
| 5 | 1 | 0.63 | 22 | 0.4 | 2.3 | 0.22 | 38 | 0.4 | 2.3 | 2 | 3/1 | 1.9/1 | 5/100 |

TABLE 5-continued

| | Measuring method | Particle diameter distribution of (P1) | | | | Particle diameter distribution of (P2) | | | | Number of peaks | (P1)/(P2) | | Valley height/ (P2) |
|---|---|---|---|---|---|---|---|---|---|---|---|---|---|
| | | Average particle diameter | Variation coefficient | Skew- ness | Kur- tosis | Average particle diameter | Variation coefficient | Skew- ness | Kur- tosis | | Particle diameter ratio | Height ratio | |
| 6 | 1 | 0.72 | 52 | 1.3 | 3.8 | 0.06 | 45 | 0.8 | 4.1 | 2 | 12/1 | 3.2/1 | 0/100 |
| | 2 | 0.70 | 65 | 1.3 | 4.8 | 0.08 | 45 | 0.9 | 4.3 | 2 | 9/1 | 3.0/1 | 0/100 |
| 7 | 1 | 0.79 | 86 | 1.3 | 3.6 | 0.07 | 38 | 0.6 | 3.6 | 2 | 11/1 | 3.0/1 | 0/100 |
| | 2 | 0.81 | 75 | 1.2 | 3.9 | 0.06 | 42 | 0.7 | 3.2 | 2 | 14/1 | 3.0/1 | 0/100 |
| 8 | 1 | 0.67 | 48 | 1.6 | 2.3 | 0.17 | 28 | 0.7 | 2.3 | 2 | 4/1 | 2.8/1 | 10/100 |
| | 2 | 0.63 | 47 | 1.6 | 2.4 | 0.15 | 18 | 0.9 | 2.3 | 2 | 4/1 | 2.6/1 | 10/100 |
| 9 | 1 | 0.72 | 35 | 0.8 | 1.9 | 0.06 | 51 | 1.3 | 2.0 | 2 | 12/1 | 3.3/1 | 0/100 |
| | 2 | 0.75 | 28 | 0.8 | 1.9 | 0.06 | 51 | 1.3 | 2.0 | 2 | 13/1 | 3.3/1 | 0/100 |
| 10 | 1 | 0.70 | 51 | 1.3 | 3.9 | 0.07 | 46 | 1.1 | 4.0 | 2 | 10/1 | 3.2/1 | 0/100 |
| | 2 | 0.69 | 62 | 1.2 | 3.8 | 0.07 | 48 | 1.2 | 3.7 | 2 | 10/1 | 3.2/1 | 0/100 |
| Comparative Examples | | | | | | | | | | | | | |
| 1 | 1 | 0.08 | 53 | 1.3 | 4.3 | — | — | — | — | 1 | — | — | — |
| 2 | 1 | 0.65 | 58 | 1.3 | 4.5 | — | — | — | — | 1 | — | — | — |
| 3 | 1 | 4.70 | 160 | −0.3 | 0.8 | 0.07 | 47 | 1.2 | 4.3 | 2 | 78/1 | 2.5/1 | 0/100 |
| 4 | 1 | 0.12 | 76 | 1.3 | 1.3 | 0.08 | 63 | 1.2 | 1.4 | 2 | 1.5/1 | — | 53/100 |
| | 2 | 0.12 | 80 | 1.3 | 1.5 | 0.08 | 63 | 1.4 | 1.4 | 2 | 1.5/1 | — | 53/100 |
| 5 | 1 | 0.98 | 145 | 1.6 | 1.1 | 0.68 | 103 | 1.9 | 1.3 | 2 | 1.4/1 | — | 62/100 |
| | 2 | 0.95 | 140 | 1.6 | 1.5 | 0.71 | 110 | 1.7 | 2.3 | 2 | 1.3/1 | — | 65/100 |

TABLE 6

| | Coefficient A | Constant item B | Contri- bution rate | Viscosity (mPa · s) | Stability with day |
|---|---|---|---|---|---|
| Example 1 | −0.015 | 1.16 | 0.89 | 3250 | >90 |
| Example 2 | −0.020 | 1.56 | 0.74 | 2350 | >90 |
| Example 3 | −0.019 | 1.49 | 0.91 | 2600 | >90 |
| Example 4 | −0.020 | 1.56 | 0.74 | 3650 | >90 |
| Example 5 | −0.019 | 1.49 | 0.99 | 1050 | >90 |
| Example 6 | −0.018 | 1.45 | 0.92 | 3050 | >90 |
| Example 7 | −0.021 | 1.69 | 0.89 | 2200 | >90 |
| Example 8 | −0.020 | 1.48 | 0.92 | 2320 | >90 |
| Example 9 | −0.021 | 1.65 | 0.89 | 3380 | >90 |
| Example 10 | −0.016 | 1.17 | 0.88 | 3020 | >90 |
| Comparative Example 1 | −0.007 | 0.67 | 0.96 | >50000 | >90 |
| Comparative Example 2 | −0.008 | 0.74 | 0.94 | 35000 | 60 |
| Comparative Example 3 | −0.310 | 23.0 | 0.99 | 900 | 3 |
| Comparative Example 4 | −0.006 | 0.63 | 0.96 | 14200 | 60 |
| Comparative Example 5 | −0.010 | 0.83 | 0.91 | 8800 | 60 |

EXAMPLES 11 TO 20

Using respective dispersions obtained in Examples 1 to 10 and Comparative Examples 1 to 5, aqueous paints were prepared as follows:

300 Parts of a dispersion was taken into a beaker, 165 parts of ion-exchanged water, and 0.1 part of a pigment dispersant [manufactured by Sanyo Chemical Industries, Ltd., CARRYBON L-400] were added, and the materials were stirred and mixed for 15 minutes at a rotation number of 300 rpm using a propeller stirring wing. Then, this mixed solution was transferred to a bead mill container, 60 parts of a pigment [manufactured by Sanyo Color Works Ltd., Emacol NS WHITE A 426], 0.1 part of an anti-foaming agent [manufactured by San Nopco, Ltd., Nopco8034L] and 75 parts of a crosslinking agent [manufactured by Mitsui Cyanamide, Cymel 325] were added, 250 parts of zirconium beads having a diameter of 1 mm were added, the mixture was shaken for 2 hours, and beads were removed to obtain an aqueous paint having a solid matter concentration of 55%. A viscosity at $SR1000s^{-1}$ and $10s^{-1}$ was measured using a high shear viscometer (manufactured by Nippon Seiki Co., Ltd., HSV-2).

Since aqueous paints having a solid matter concentration of 55% obtained from respective dispersions of Comparative Examples 1 to 5 have a viscosity at $SR1000s^{-1}$ of 45 to 60 mPa·s, and have a too high viscosity for spray coating, those aqueous paints were diluted with ion-exchanged water to obtain aqueous paints having a solid matter concentration of 40%.

In addition, regarding aqueous paints having a solid matter concentration of 55% obtained from dispersions of Comparative Examples 4 and 5, in order to adjust a viscosity at $SR1000s^{-1}$ and $SR10s^{-1}$ to an optimal viscosity, it was necessary to dilute aqueous paints with ion-exchanged water and add 4.0 parts of a viscosity adjusting agent [manufactured by San Nopco, Ltd., SN Thickener A-636], and aqueous paints having a solid matter concentration of 20% were finally obtained.

These aqueous paints were spray-coated on a 8 cm×15 cm aluminum plate having a thickness of 1.0 mm, at a back pressure of 2.0 Kg/cm² using a spraying gun. Coating was performed at a thickness of 200 μm (wet-state), and the plate was dried at 80° C. using an air drier. After initiation of drying, a weight was measured every one minute, and a time until a change rate in a coated film weight after drying became 0.1% or smaller (drying time) was measured. Thereafter, the plate was cooled to room temperature, and a dry film thickness was measured with a contact digital film thickness meter (manufactured by OZAKI MGG, GS-10). In addition, stability with day of these aqueous paints were assessed.

These results are shown in Table 7.

an adhesion substrate is rapid, and a quick-drying adhesive is obtained. In addition, since an adhesive for dry laminating shortens a drying time, productivity of a laminating step can be improved.

Further, since a pigment printing binder has a high concentration, lack of thickness hardly occurs.

TABLE 7

| | Dispersion example No. | Solid matter concentration (%) | Viscosity (mPa · s) | | Drying time (min) | Dry film thickness (μm) | Stability with day |
|---|---|---|---|---|---|---|---|
| | | | $SR1000_s^{-1}$ | $SR10_s^{-1}$ | | | |
| Examples | | | | | | | |
| 11 | Example 1 | 55 | 30 | 215 | 2 | 110 | >90 |
| 12 | Example 2 | 55 | 33 | 235 | 2 | 112 | >90 |
| 13 | Example 3 | 55 | 30 | 220 | 2 | 105 | >90 |
| 14 | Example 4 | 55 | 32 | 220 | 2 | 110 | >90 |
| 15 | Example 5 | 55 | 29 | 215 | 2 | 113 | >90 |
| 16 | Example 6 | 55 | 28 | 230 | 2 | 106 | >90 |
| 17 | Example 7 | 55 | 32 | 230 | 2 | 110 | >90 |
| 18 | Example 8 | 55 | 29 | 210 | 2 | 113 | >90 |
| 19 | Example 9 | 55 | 29 | 240 | 2 | 115 | >90 |
| 20 | Example 10 | 55 | 32 | 220 | 2 | 113 | >90 |
| Comparative Examples | | | | | | | |
| 6 | Comparative Example 1 | 40 | 28 | 115 | 4 | 86 | 30 |
| 7 | Comparative Example 2 | 40 | 30 | 105 | 4 | 88 | 35 |
| 8 | Comparative Example 3 | 40 | 23 | 110 | 4 | 83 | 32 |
| 9 | Comparative Example 4 | 40 | 21 | 100 | 4 | 84 | 30 |
| 10 | Comparative Example 5 | 40 | 20 | 97 | 4 | 82 | 30 |
| 11 | Comparative Example 4 | 20 | 31 | 235 | 7 | 46 | 19 |
| 12 | Comparative Example 5 | 20 | 33 | 220 | 7 | 43 | 18 |

INDUSTRIAL FIELD OF APPLICABILITY

The dispersion of the present invention exhibits a low viscosity even at a high concentration exceeding 65%, and has better stability with day. In addition, paints, adhesives, pressure-sensitive adhesives and fiber and textile processing and treating agents using the dispersion of the present invention are excellent in storage stability even at a high concentration.

Since the paint of the present invention is also excellent in coating stability, and has a high concentration, a drying rate can be improved considerably, and it becomes possible to perform coating at a large thickness, thus, the paint contributes to great improvement in productivity. An aqueous paint has a viscosity at high shear and low shear, equivalent to a viscosity of the previous aqueous paint having a solid matter concentration level of 20% in which a viscosity adjusting agent is added, even at a high solid matter concentration of 55%, a drying rate can be improved considerably and, at the same time, it becomes possible to perform coating at a large thickness, while maintaining the same level of coating stability as that of the pervious aqueous paint.

In addition, since the adhesive of the present invention has a low viscosity even at a high concentration, immersion into

What is claimed is:

1. An aqueous dispersion comprising particles of at least one resin selected from the group consisting of a polyaddition resin, a polycondensation resin, an addition condensation resin, a ring-opening-polymerization resin and an addition polymerization resin; wherein the particles exhibit at least two peaks in a particle diameter distribution curve; at least one peak of the peaks comprises at least one resin selected from the group consisting of a polyaddition resin, a polycondensation resin, an addition condensation resin and a ring-opening-polymerization resin; the aqueous dispersion satisfies one or both of the following (i) and (ii):

(i) wherein in a particle diameter distribution curve for the aqueous dispersion, a highest peak (P1) and a second highest peak (P2) exhibit the particle distribution curved exhibits the following properties: a ratio of a particle diameter corresponding to a maxima of (P1) to a particle diameter corresponding to a maxima of (P2) is in a range of 2/1 to 100/1; a ratio of a particle count value at a maximum height of (P1) to a particle count value at a maximum height of (P2) is in a range of 1/1 to 10/1, (P1) and (P2) have a peak variation coefficient of a peak of 0.1 to 150%, (P1) and (P2) have a skewness of −10 to 10 and (P1) and (P2) have a kurtosis of 0 to 10, and (ii) if a concentration range of an aqueous dispersion is 20 to 70% by weight, the aqueous dispersion satisfies the following relation equation (1) having a coefficient A of −2 to 0 and a constant item B of 1 to 5:

$$1/\log(\eta/-\eta o) = A\phi + B \quad (1)$$

wherein η0 and η represent a Brookfield viscosity (mPa·s, 25° C.) of water and the aqueous dispersion having a resin concentration of ϕ% by weight.

2. The dispersion according to claim 1, wherein the difference between a hydrophilic-lipophylic balance ("HLB") of a resin represented by (P1) and an HLB of a resin represented by (P2), the difference in HLBs of the two resins being between 0.1 to 10.

3. The dispersion according to claim 1, wherein (P1) has a peaktop particle diameter of 0.1 to 4 μm.

4. The dispersion according to claim 1, wherein (P1) and (P2) have a ratio of a peaktop particle diameter of (P1)/ a peaktop diameter of (P2) in a range of 2.2/1 to 20/1.

5. The dispersion according to claim 1, wherein the particle diameter distribution curve has a lowest valley not exceeding 80% of the height of the peaktop of (P2) between (P1) and (P2).

6. The dispersion according to claim 1, wherein the resin forming (P1) or (P2) is at least one resin selected from the group consisting of a polyurethane resin, a polyester resin, a polyamide resin, a silicone resin, a polycarbonate resin, a phenol resin, an amino resin, an epoxy resin, an acrylic resin and a styrene resin.

7. The dispersion according to claim 1, wherein at least one of (P1) and (P2) contains a hydrophilic group (Q) having the number of groups inherent to an atomic entity by a Davis method of 0.3 or larger.

8. The dispersion according to claim 7, wherein the hydrophilic group (Q) is one or more selected from the group consisting of a carboxyl group, a carboxylate group, a sulfonic acid group, a sulfonate group and an oxyethylene group.

9. The dispersion according to claim 7, wherein the resin forming (P1) and the resin forming (P2) have a difference in content of the hydrophilic group (Q) of 0.1% by weight of larger.

10. The dispersion according to claim 1, wherein the concentration of resin particles in the dispersion is 50 to 75% by weight.

11. The dispersion according to claim 1, which comprises an aqueous dispersion of a resin comprising a resin (A1) and other resin (A2) each of (A1) and (A2) having two or more different particle diameters, and is obtained by dispersing a solution or a melt of (A2) or a precursor of (A2) in an aqueous dispersion of (A1) and, in the case of a precursor, converting the precursor into (A2).

12. The dispersion according to claim 11, wherein the precursor is dispersed into an aqueous dispersion of (A1) using at least one emulsifying machine selected from a rotator-stator emulsifying machine, a line mill emulsifying machine, a static tube mixing emulsifying machine, a vibration emulsifying machine, an ultrasonic shock emulsifying machine, a high pressure impact emulsifying machine, a membrane emulsification emulsifying machine, a centrifugation thin membrane contact emulsifying machine and an anchor agitator emulsifying machine.

13. The dispersion according to claim 11, wherein the aqueous dispersion comprises a mixture of resin (A1) and resin (A2), wherein the mixture comprises 10 to 50% by weight of (A1) and 50 to 90% by weight of (A2).

14. The dispersion according to claim 11, wherein the resin (A1) is a polyurethane resin obtained by adding polyamine to an aqueous dispersion of a urethane prepolymer having NCO terminal groups, and subjecting the prepolymer to chain extension.

15. The dispersion according to claim 14, wherein the aqueous dispersion of a prepolymer is formed using an emulsifying machine selected from a rotator-stator emulsifying machine, a line mill emulsifying machine, a static tube mixing emulsifying machine, a vibration emulsifying machine, an ultrasonic shock emulsifying machine, a high pressure impact emulsifying machine, a membrane emulsification emulsifying machine, a centrifugation thin membrane contact emulsifying machine and an anchor agitator emulsifying machine.

16. The dispersion according to claim 14, wherein a chain extension reaction of the polyamine and the prepolymer is performed in a batch reaction apparatus.

17. A powdery resin obtained from the dispersion as defined in claim 1.

18. A paint, an adhesive, a pressure-sensitive adhesive or a fiber processing and treating agent, which comprises the dispersion as defined in claim 1.

* * * * *